United States Patent
Naujok et al.

(10) Patent No.: US 12,229,081 B2
(45) Date of Patent: Feb. 18, 2025

(54) EXTENDING FILESYSTEM DOMAINS WITH A DOMAIN MEMBERSHIP CONDITION

(71) Applicant: Dell Products, L.P., Round Rock, TX (US)

(72) Inventors: Barry Naujok, Lilydale (AU); Jonathan Walton, Seattle, WA (US); Chris Stacey, Seattle, WA (US); Mayank Rajawat, Issaquah, WA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 238 days.

(21) Appl. No.: 17/580,791

(22) Filed: Jan. 21, 2022

(65) Prior Publication Data
US 2023/0237016 A1    Jul. 27, 2023

(51) Int. Cl.
*G06F 16/11* (2019.01)
*G06F 16/14* (2019.01)
*G06F 16/783* (2019.01)

(52) U.S. Cl.
CPC .......... *G06F 16/128* (2019.01); *G06F 16/122* (2019.01); *G06F 16/152* (2019.01); *G06F 16/7864* (2019.01)

(58) Field of Classification Search
CPC ........ G06F 16/128; G06F 11/14; G06F 11/16; G06F 16/7864; G06F 16/122; G06F 11/1446; G06F 16/185
See application file for complete search history.

(56) References Cited

U.S. PATENT DOCUMENTS

| | | | |
|---|---|---|---|
| 10,305,758 B1 * | 5/2019 | Bhide | G06F 11/3409 |
| 10,423,686 B2 * | 9/2019 | Portnoy | G06F 16/9535 |
| 10,972,580 B1 * | 4/2021 | Dorn | H04L 41/0246 |
| 11,573,955 B1 * | 2/2023 | James | G06F 16/2228 |
| 11,768,960 B1 * | 9/2023 | Carasso | G06F 16/2322 707/756 |
| 2007/0033191 A1 * | 2/2007 | Hornkvist | G06F 16/14 707/999.009 |
| 2014/0067929 A1 * | 3/2014 | Kirigin | H04L 67/06 709/204 |
| 2014/0089459 A1 * | 3/2014 | Werr | H04L 67/1097 709/217 |
| 2016/0292437 A1 * | 10/2016 | Manmohan | H04L 9/3242 |
| 2017/0060941 A1 * | 3/2017 | Yan | G06F 16/148 |
| 2019/0188293 A1 * | 6/2019 | Argyros | G06F 16/258 |
| 2019/0362290 A1 * | 11/2019 | Rogynskyy | H04L 43/045 |
| 2020/0250136 A1 * | 8/2020 | Ballal | G06F 16/185 |
| 2020/0250137 A1 * | 8/2020 | Rajawat | H04L 67/1097 |
| 2022/0247569 A1 * | 8/2022 | Okano | H04L 63/123 |

* cited by examiner

*Primary Examiner* — Vaishali Shah
(74) *Attorney, Agent, or Firm* — Amin, Turocy & Watson, LLP

(57) ABSTRACT

The described technology is generally directed an extension to the IFS domains architecture, referred to herein as filter domains. IFS domains allows tagging of files in a tree-like dataset. Thus, a domain can be defined at the root of the dataset such as the topmost directory under which all files reside. These domains are inherently hierarchical, path-based entities. Filter domains extends this organization to allow domains to be applied beyond hierarchical tree structures in order to also provide arbitrary grouping of file objects based on any suitable membership condition.

20 Claims, 23 Drawing Sheets

EXTENDING FILESYSTEM DOMAINS WITH A DOMAIN MEMBERSHIP CONDITION

TECHNICAL FIELD

The subject application relates generally to an extension within a filesystem to the domains architecture, and more particularly, to implementing an arbitrary condition to satisfy membership on top of the domains architecture.

BACKGROUND

A filesystem snapshot, such as in OneFS®, captures a point-in-time representation of the filesystem cluster data. A snapshot maintains a logical image of the data that existed in a directory at the moment when the snapshot was created.

A snapshot is taken at a directory-level, and in OneFS® uses pointers to reference current blocks on the cluster. If the data referenced by a snapshot is modified, the snapshot stores a read-only copy of the original block, e.g., in a copy-on-write operation.

The snapshot data service uses a mechanism called "painting" that walks a parent directory path to discover which files are under snapshot control. This is an expensive operation that has to be performed for many files in the filesystem whenever a new snapshot is taken, including for files that are not part of a snapshot.

The introduction of domains allowed filesystem snapshot and other filesystem services to leverage a domain cache (e.g., stored in an inode) to determine whether a given file object is a member of a domain and therefore subject to the snapshot or other filesystem service operation. By caching this information, membership information can be instantly available without relying on expensive operations such as a parent walk

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
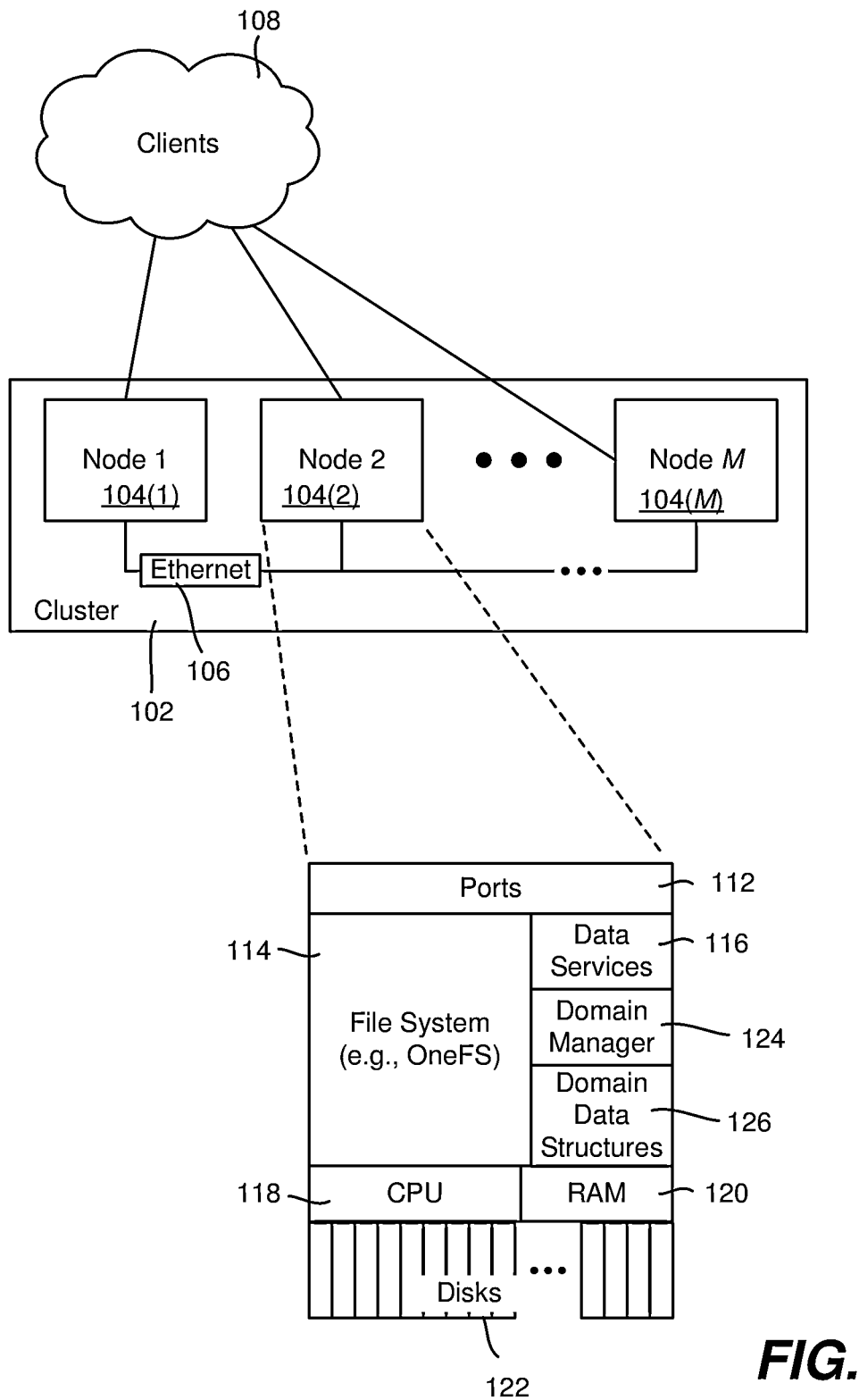
FIG. 1 is an example block diagram representation of a distributed filesystem including nodes, in which a domain manager maintains domain membership information for data services, in accordance with various aspects and implementations of the subject disclosure.

Various aspects of the technology described herein are generally directed to extending the domains technology within a filesystem such as an integrated filesystem (IFS) This extension is referred to herein as "filter domains" to distinguish from "domains" or "IFS domains" technology. IFS domains allows tagging of files in a tree-like dataset. A user can define a domain at the root of the dataset (e.g., a top directory under which all files reside). Once the domain is created, a background tagging operation is started that marks all the files under the root with the domain ID of the newly created domain. If membership into this domain is requested for a file that is not yet tagged by the new domain, a parent walk can be performed on-the-fly that walks the parent chain to discover any new domain among ancestors and always returns the correct answer. This gives an IFS Domains application programming interface (API) "instant readiness". Any parent walk activity can also be cached as it goes, so that any expensive operations (e.g., like parent walks) trend towards zero. IFS domains technology also handles renames (e.g., moves) of non-empty directories by a similar mechanism.

This allows applications to take actions based on membership results such as: if (get_membership(filehandle, ARCHIVE_DOMAIN)==true) then move_to_archive_tier (filehandle).

IFS domains is typically categorized as a membership layer, not an indexing layer. However, building an index can be accomplished as the IFS domains infrastructure provides a call back when membership of a file is changed. Thus, a per-domain index can be kept up-to-date as membership of a file evolves over the lifetime of the dataset.

Filter domains (also referred to as "filtered domains") represents an extension of the IFS domains technology to allow application beyond hierarchical tree structures, and also capture arbitrary grouping of file objects. For example, a given hierarchy-based IFS domain can have an extra filter clause added, and can match only those files that satisfy the filter clause in addition to the path-based hierarchy test. Filter domains can be refined by attributes such as, e.g., "all 'gold' files under domain X" or "all files under domain X and on pool Y".

Those attributes might be set automatically (e.g., set based on file size), programmatically (e.g., set based on auto-annotation by a script), or manually (e.g., via a customer user interface—either via a domains user interface or another user interface that pushes the information to the domains platform).

Attributes that are to be applied recursively by domains might actually be 'applied' by a domain too, in a nested/ chainable fashion. For example, consider the following three scenarios: (i) Consider a filter domain for a filesystem snapshot service: All 'gold' files under/dir/ should be shapshotted hourly. (ii) Consider a domain application of attributes: All files under /dir/subdir/ should be marked as 'gold'. (iii) Consider a filter domain application of attributes: All files under/dir/subdir2 that are larger than 20 MB should be marked as 'gold'.

It can be observed that together, (i) and (ii) or (i) and (iii) use a domain to define an attribute, and an attribute to define a domain. By these techniques, a customer can independently and cleanly define a rule to apply to a set of files, and have a separate policy enforced as a result.

Advantageously, existing code, written to test file membership via hierarchy-based IFS domains, can continue using the same API to test membership for filtered domains. Hence, decisions like "should I snapshot this file" or "is this file governed by a quota" can be pivoted towards more complex definitions than just "files under this directory", but can also include other attributes.

Membership in a filtered domain can be tracked and maintained efficiently, so that "is this file part of this domain" tests can happen in fast time due to the "instant readiness" character of IFS domains. Recall that in the steady-state of IFS domains, membership to a domain can be quickly derived by simply checking whether the file has been tagged (e.g., in the inode, or in a separate data store) as part of the domain.

When domain settings are modified, the pre-calculated tags may not immediately reflect the latest policy. In that case, membership can be recalculated in real-time (e.g., "instant readiness"). It is appreciated that by co-locating the "filter policy predicate" code with the "domain definition" implementation code, it is possible to have the domain code actually evaluate filter policies on-the-fly. That provides "instant readiness". Further, these results can then be efficiently cached to avoid repeating any similar expensive evaluations again.

However, it is appreciated that caching those domain membership calculations will rely on an adequate invalidation policy. For example, anything that modifies the size or name of a file can invalidate and/or invoke a recalculation of any domain-membership decisions based on that name or the file size.

Generally speaking, caching is often a difficult task to successfully implement and typically is not even possible for predicates that change without code-paths being executed. For example, consider an attribute based on file age metrics such as only include files "older than 12 hours". Since the value of a test for "older than 12 hours" can change from false to true without running any filesystem code, allowance can be made for different types of invalidation schemes.

As such, "instant readiness" for timestamp-based comparisons can be handled separately. Further, such can lead to a tiered strategies based on a defined difficulty to keep the cache in a valid state. For example, attribute elements that are relatively simple to keep cache-consistent can be cached and preserved on the inode as described herein. On the other hand, attribute elements that are difficult or impossible to keep cache-coherent (e.g., such as timestamp comparisons, but also certain code-paths that are less predictable or more expensive to tap), the final domain membership decision can always go through something akin to an instant-ready check. In this instant-ready check, when membership is queried, the response can be to check any outstanding conditions.

Hence, an example of the above-mentioned tiered strategies can be based on the following: If membership calculation is expensive, then always cache the calculation. If the membership calculation is expensive or impossible to invalidate, then do not attempt to cache the results. If membership is cheap to calculate and invalidate, then the results can be cached or not. Because an objective of IFS domains is to allow efficient domain membership checks, in order to satisfy that objective, a mix of the above three strategies can be applied to manage "instant membership" and caches in a way that only calculates the cachable items when necessary, but uses cached results the remainder of the time.

In order to more fully describe the techniques and concepts associated with filter domains, this specification reviews the concepts of IFS domains generally within the context of an IFS snapshot service being a consumer (e.g., domain patron) of the IFS domain membership results. Thereafter, various concepts and implementation details relating to filter domains, which extend IFS domains, are further discussed.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

It should be understood that any of the examples herein are non-limiting, and that variations to the technology can be implemented. For instance, some of the examples are based on the OneFS® filesystem, which in general in one or more implementations comprises a distributed filesystem with a single filesystem namespace; however virtually any filesystem may benefit from the technology described herein. Moreover, the term "disk" or "disks" is used in many of the examples described herein, however it is understood that any data storage resource /storage device may be used instead of or in addition to disks. Thus, any of the embodiments, aspects, concepts, structures, functionalities or examples described herein are non-limiting, and the technology may be used in various ways that provide benefits and advantages in computing and filesystems in general.

Referring now to FIG. 1, in general, IFS domains relates to a framework that manages the creation and maintenance of partitions of a namespace. Such partitions are referred to as domains, and can be used by any appropriate data service, including a snapshot data service. As used herein, domains can refer to the partitions of a namespace, as well as a domain service of a filesystem that provides domain-related information, such as a set of domain identifiers that identify one or more domains of which a file object is a member.

In general, a data service (sometimes referred to as a domain "patron") uses the domain framework, e.g. accessed via an interface, to map a group of files to a domain. In one or more implementations, the mapping is at a directory level, in which files are grouped into a domain as a directory tree. A directory associated with a domain can be a newly created empty directory or an existing directory possibly containing an existing group of files. In this way, a directory or file object within that directory becomes a member of a domain.

Once a domain is associated with a file, a data service is able to use the domain framework to determine the file's domain membership, that is, to determine the file's associated domain or domains (which are represented by domain identifiers). The domains can be filtered for that particular data service, e.g., a snapshot data service that requests domain membership information receives snapshot-created domains, a quota data service receives quota-created domains, and so on. A significant feature of domains as described herein is that only one domain need be internally created for a single directory entry for any data service that needs the membership information starting at that directory. This saves significant time and resources for generating and maintaining membership information, compared to where each data service maintains its own grouping information.

By way of example, consider that a particular data service wants to know whether to include a file in a particular data service-related operation, e.g., include a file (or not) in a snapshot copy-on-write operation. The snapshot data service obtains the domain membership information associated with the file, and uses the domain membership information to determine whether this file is to be part of the snapshot-related operation. Using the same domain membership information associated with the file, a different data service can do the same thing with respect to one if its operations. A domain manager can filter the domain membership information based on which data service is requesting the domain membership information.

Moreover, the membership information (in most instances) can be rapidly returned to a requesting data service in near constant time. As will be understood, this is because each file and directory is tagged with the domain membership information in its metadata, e.g. in a file attribute for a file object. This is in contrast to other per-data service file grouping solutions that need to walk a directory hierarchy each time to determine whether the data service's pending operation applies to a given file.

Thus, a data service can create a domain on a group of files, e.g., at a directory level. In this way, for example, a snapshot service can specify that a snapshot policy (such as take a snapshot weekly) be applied to /root/data/foo/, because the snapshot service has mapped /root/data/foo/ to a domain.

Moreover, a data service can exclude a group of files by using an exclusion domain, so that, for example, the snapshot data service can exclude /root/data/foo/temp from the snapshot policy. To this end, the snapshot data service can (via a call to the domain manager) create an exclusion instance domain associated with /root/data/foo/temp and the files in that directory.

By linking two (or more) domains, such as via a parent-child relationship, exclusion instance can be blanket exclusions that operates at the domain level. For example, consider that a file has a domain membership set of comprising domain identifiers. The domain identifiers 2, 6, 14 are inclusion instances, while instance 17 is an exclusion to instance 6. When a data service requests the domain membership information from a domain manager, the domain manager can automatically apply the exclusions (exclusion domain identifier 17 excludes domain identifier 6) and thus the domain manager returns the resultant membership set of domain identifiers to the caller.

For snapshots, a more granular type of exclusion is available that is based on snapshot identifiers. More particularly, any data service including a snapshot data service that uses the domain technology described herein can have its own metadata maintained in a domain data structure (e.g., a system B-tree, or SBT). The snapshot data service can thus maintain a set of snapshot identifiers associated with a domain that are inclusion snapshot identifiers, along with another set of snapshot identifiers associated with another domain that are exclusion snapshot identifiers. For example consider that a domain identifier of D2 is associated by the snapshot data service data with inclusion snapshot identifiers {1, 2, 3, 4, 5} while another domain identifier of D3 is associated by the snapshot data service data with exclusion snapshot identifiers {2, 3}. This allows, for example, the snapshot data service to associate a file X with domains D2 and D3, which thereby associates the file X with snapshot identifiers {1, 4, 5}.

FIG. 1 shows a distributed filesystem such as OneFS® comprising a cluster 102 of nodes 104(1)-104(M), in which each node is typically a server configured primarily to serve files in response to client requests. The nodes 104(1)-104(M) are coupled to each other via a suitable data communications link comprising interfaces and protocols such as represented in FIG. 1 by Ethernet block 106.

Clients 108 make filesystem-related requests to the cluster 102, which in general is configured as one large filesystem namespace; there may be on the order of billions of files maintained in a cluster, for example. To this end, a node such as the node 104(2) generally comprises ports 112 by which clients connect to the distributed filesystem. Example ports are provided for requests via various protocols, including but not limited to SMB (server message block), FTP (file transfer protocol), HTTP/HTTPS (hypertext transfer protocol) and NFS (Network Filesystem); further, SSH (secure shell) allows administration-related requests, for example.

Each node includes (or is coupled to) an instance of the distributed filed system 114 and data services 116, which as described herein, includes a snapshot data service. A CPU 118 and RAM 120 are shown for completeness; note that the RAM 120 may comprise at least some non-volatile RAM. The node includes storage devices such as disks 122, comprising hard disk drives and/or solid-state drives. Filesystem I/O (input/output), such as file object reads and writes may be to the local disk or to the disks of one or more other nodes; the physical location or locations of a filesystem object (directory or file, along with associated metadata) is generally transparent to the client.

As described herein, a domain manager 124 and domain data structures 126 facilitate the domain technology. Although not explicitly shown, it is understood that the filesystem 114, the data services 116, the domain manager 124 and domain data structures 126 are implemented in the RAM 120 or the disks 122, or a combination of both. Moreover, some of the components and/or part thereof can be per-cluster or per-multiple nodes rather than per-node; e.g., it is feasible to have a data service running on one node that operates on at least one other node.

When a domain is created on a directory, the directory itself and the nodes (descendants) under that directory need to be associated with that domain. To this end, a pre-existing directory tree is walked and tagged with the new domain identifier. For a directory already associated with one or more domains, including an empty directory, as new file objects (and subdirectories) are added to that directory, the new file objects and subdirectories automatically inherit the domain membership.

Figure 2:
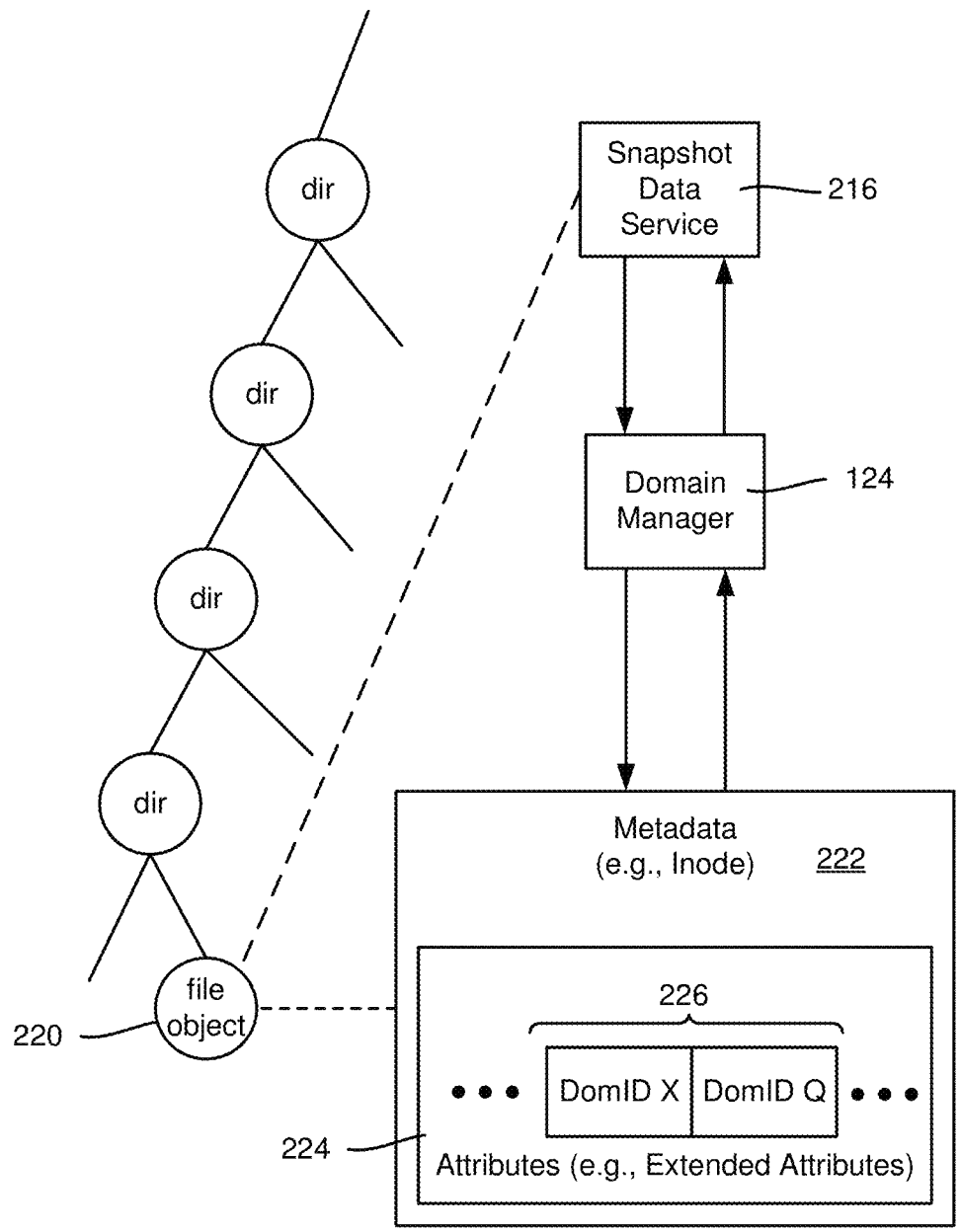
FIG. 2 is an example representation of associating domain information with metadata of a file object, in accordance with various aspects and implementations of the subject disclosure.

FIG. 2 shows an implementation in which a file object 220 is associated with domain membership information. In this example, metadata 222 (such as maintained in an inode (index node)) comprises various attributes/extended attributes 224, wherein an inode attribute comprises a dynamic attribute that can be set and read on an inode and can be of a varying length. The metadata includes a domain attribute comprising a dynamic inode attribute set on a file to indicate the file object's domain membership. As shown in FIG. 2, a domain attribute can hold one or more domain identifiers 226 (e.g., DomID X and DomID Q, where X and Q represent, for example, 64-bit identifiers that are unique at least within the filesystem). Although not explicitly shown, directories can also be associated with domains through one or more domain identifiers.

Because of the direct association via the metadata 222, the domain membership comprising the one or more domain identifiers 226 is thus (almost) immediately available to a snapshot data service 216 in near constant time. The domain manager 124 provides this domain membership information on request from the snapshot data service 216, and also provides interfaces or the like for a data service to create domains, delete domains, and so forth as described herein. Note that an exception to immediate constant time retrieval of the domain membership information occurs when a new domain is created on an existing directory, and the directory tree is being walked and tagged with the new domain identifier as described herein. Note that an unmarked file is a file with its domain attribute not (yet) marked with any domain identifier.

Figure 3:
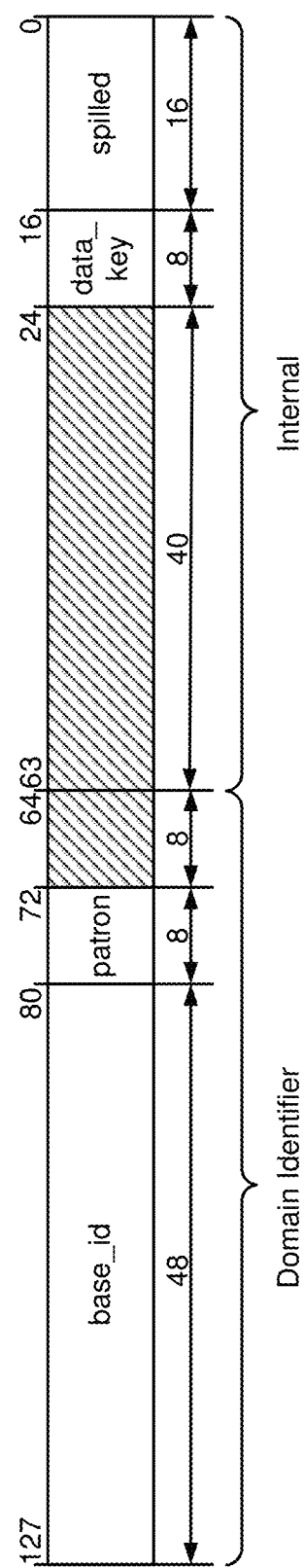
FIG. 3 is a representation of example components of a key to a domain data structure, in accordance with various aspects and implementations of the subject disclosure.

Each data service (domain patron) that needs membership information from a particular directory is referred to herein as a "domain instance." Each domain instance is represented by a domain identifier (e.g., a 64-bits number, for brevity sometimes referred to as a "DomID"). FIG. 3 shows an example "key" data structure including a portion that serves as the domain identifier.

Information common to more than one domain instance that is rooted at one directory can be stored in a common location for the instances. Such as common entry is referred to as the domain base entry (or "DomBE" for brevity). The domain base entry contains data representing the owning root directory's Logical Inode Number (LIN, a cluster-unique identifier for a file object), along with data that indicates whether tagging is in progress or has completed, data that indicates whether one or more nested domains (described below) are undergoing tagging, and a reference count for instances and the owning root directory.

In one or more implementations, domain information is stored in a domain-related data structure, which in one particular implementation comprises a dedicated System B-Tree (SBT). At various times domain patrons will need domain-related information, such as during their interception of filesystem operations, and therefore will need efficient access to patron-specific internal data. As shown in the example of FIG. 3, a key (e.g., 128 bits) for each SBT entry comprises the exposed 64-bit domain identifier and a 64-bit internal sub-key to allow the management of discrete data blobs as needed by patrons, domain management and the I/O path. More particularly, in the example of FIG. 3, each entry in the domain SBT has such a 128-bit key, with the key divided in half with first half being the public domain identifier (public to the filesystem and other components thereof), and the second half for internal usage, e.g., for separating data used for different purposes in the domain manager and for supporting blobs of data larger than a single SBT block. In FIG. 3, the hashed/shaded portions are reserved, e.g., for possible future use. In one or more implementations, SBT key zero is reserved for global domain information.

Figure 4:
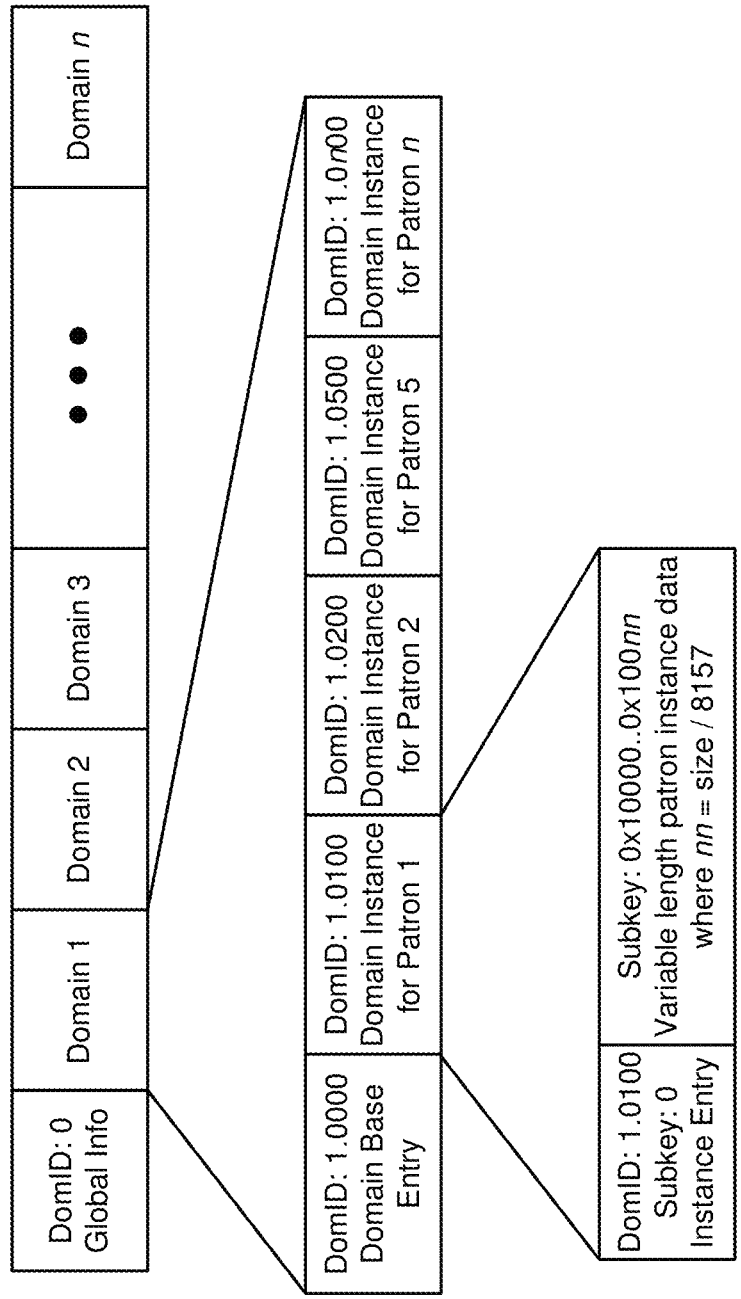
FIG. 4 is a representation of an example domain system data structure layout, in accordance with various aspects and implementations of the subject disclosure.

The logical layout of the various domain base entries, instances and patron data in the SBT is shown in FIG. 4. In this way, domain patrons store data in the SBT that is used within the I/O path. In one or more implementations, patron data can be limited (e.g., to 1 MB). In this implementation each SBT leaf can hold up to 8157 bytes, and thus multiple leaves are used to store more than 8157 bytes. Note that other domain patron configuration and miscellaneous data can be stored elsewhere, as too much data in the SBT likely will degrade the performance of the overall cluster.

In sum, the domain identifier comprises a unique numeric identifier, which also helps with the lookup in the domain's SBT space. The base domain identifier is a domain identifier that has no patron instance set representing the domain's common properties and state which is stored in a Domain Base Entry (DomBE); note that instances to a domain have a common base entry that will maintain the properties and status common to all domain instances, such as the directory LIN to which it is rooted, the number of instances, and child domain instances that may refer to this domain base entry. Each DomBE has a corresponding base domain identifier.

Thus, a patron's instance data is stored in the domains SBT. As previously shown in FIG. 3, the domain identifier uses the most significant 64 bits of the key while the least significant 64 bits are divided into sub-sections, most being reserved. The lowest 8 bits of the key are used to index data in the SBT. The data can be read and written to transactionally as one big blob. Writes can append to the end of the blob. An iterative read of the data can be performed, which has the possibility of changing unless a suitable lock is held for the duration of the read.

Figure 5:
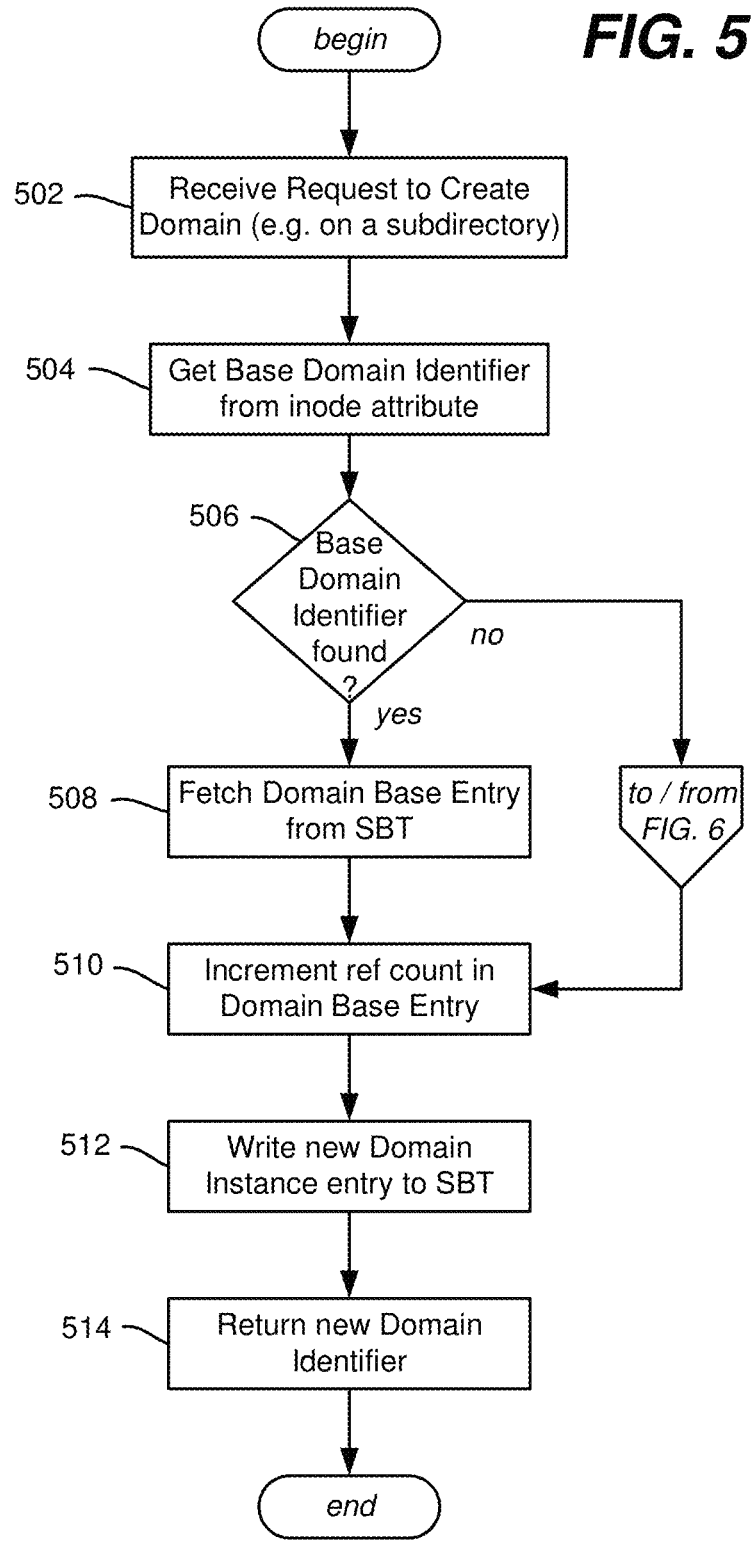
FIGS. 5 and 6 comprise a flow diagram showing example operations related to creating a domain, in accordance with various aspects and implementations of the subject disclosure.
Figure 6:
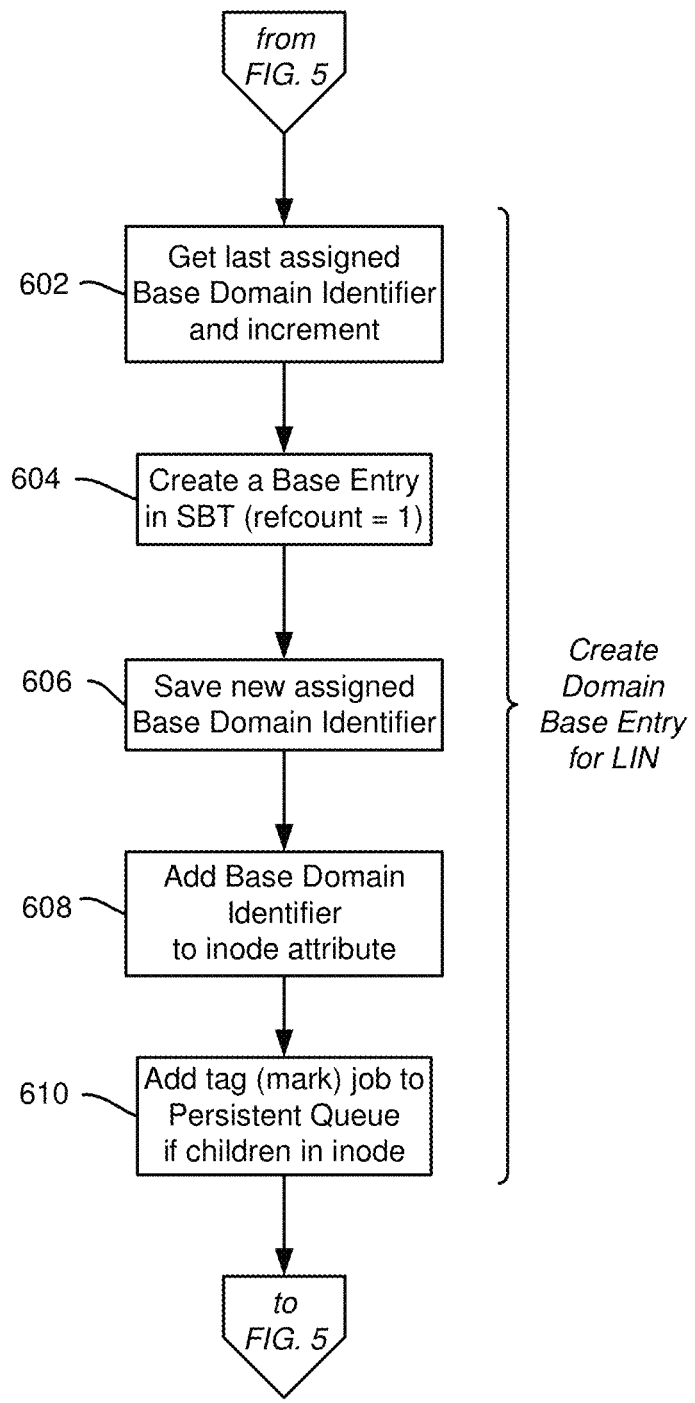

Turning to aspects related to domain creation, domain instances are created on demand by domain patron implementations, as determined by the patron implementation. As represented in FIGS. 5 and 6, the domain manager performs various operations with respect to creating a domain instance as requested by a patron (operation 502) on a directory. Operations 504 and 506 check if an existing DomBE exists for that directory. If no DomBE exists, operation 506 branches to operation 602 of FIG. 6 to create a new base entry in the SBT. Otherwise operation 508 retrieves the DomBE from the SBT at operation 508, and continues to operation 510 as described below.

If a new base entry needs to be created, operations 602, 604 and 606 of FIG. 6 operate to assign a new base domain identifier, including setting the reference count for the owning directory and saving the newly assigned base domain ID. Operation 608 adds (tags) the directory with the new base domain identifier. Operation 610 queues a job to tag the directory tree (tagging is described below), and the new entry can be committed. Note that queuing the job to tag the directory tree (at operation 610) can be skipped if the directory entry is empty and the patron allows the path leading to the domain to be renamed. In one or more implementations, patrons are allowed to deny a path rename, as described herein. The process then returns to operation 510 of FIG. 5.

Operation 510 increments the reference count in the DomBE for the new instance, and operation 512 create an entry in the SBT for the new domain instance for the patron. Operation 514 returns the newly assigned domain identifier incorporating the patron instance.

Note that some patrons allow domain instances to be nested within each other. For example, snapshots can be taken in any directory, which means that a snapshot patron instance can be nested. Other patrons that allow nesting may override and/or inherit parent domain policies. To support these, a depth field is established in the DomBE, which tracks the path component depth of each domain relative to the filesystem's mount-point. Non-nestable patrons and nesting checks are described below.

When a new DomBE is created as described with reference to FIGS. 5 and 6, the owning directory is directly tagged with the base domain identifier. As described above with reference to FIG. 2, in one or more implementations, the tags for file objects are stored in an extended inode attribute. This inode domain attribute contains an array of base domain identifiers representing the known domain membership for the file object. If the owning directory for the domain is not empty when the DomBE is created, a job is queued (operation 610) to allow the children of the directory to be tagged in a background job.

In general, for domain operations that take a while to execute and cannot be performed inline as a single kernel operation, lengthy operations are handled in the background. In one or more implementations, a job engine job breaks the operations into small pieces to be executed across the cluster (e.g., from user-space). Example operations include tagging (sometimes referred to as "marking") new domains created on an existing directory tree, re-tagging file objects that have been renamed to a different domain, and cleaning up the SBT when a domain has been deleted.

To let the domain tag job know when it needs to perform an operation, the domain manager (e.g., in the kernel) uses a persistent queue to queue the operations for the user-space domain tag job to read and initiate the jobs. A separate monitoring daemon can be used to monitor the persistent queue and start the domain tag job.

With respect to tagging, because a directory can contain thousands of existing file objects when a new domain is created, it is not practical to tag all child nodes at the domain creation time, and thus in one or more implementations, a background job is created for tagging the child nodes, which can take hours or even days to complete. To this end, the domain manager (kernel) thus adds a tag operation to the persistent queue, which a user-space daemon detects, and starts a domain tag job that walks the entire directory tree, tagging each file object that is encountered with the new base domain identifier. Note that when a domain is created on a pre-existing directory, full domain membership information potentially can take a long time to be established and possibly incur expensive parent walking and writing operations during normal I/O activities. Often multiple patrons will need domain membership starting at the same directory, typically a filesystem export point. The domain technology described herein takes advantage of this by only walking and tagging domains for a directory once. A domain is considered ready when all the files are marked.

In general, a patron often cannot wait for a tag job to complete. That is, in practice, a data service needs to determine a file's membership in-line with the data service operation, generally referred to as "instant membership." As described herein, during tagging, the membership determination can also be performed on-demand by having the domain manager walk up the file's parent path until the domain manager has discovered the domain(s) of which the file is a member. The domain manager also writes the membership information to the file's metadata, so that on a subsequent accesses to the file, the domain manager will not have to walk the parent path again.

Figure 7:
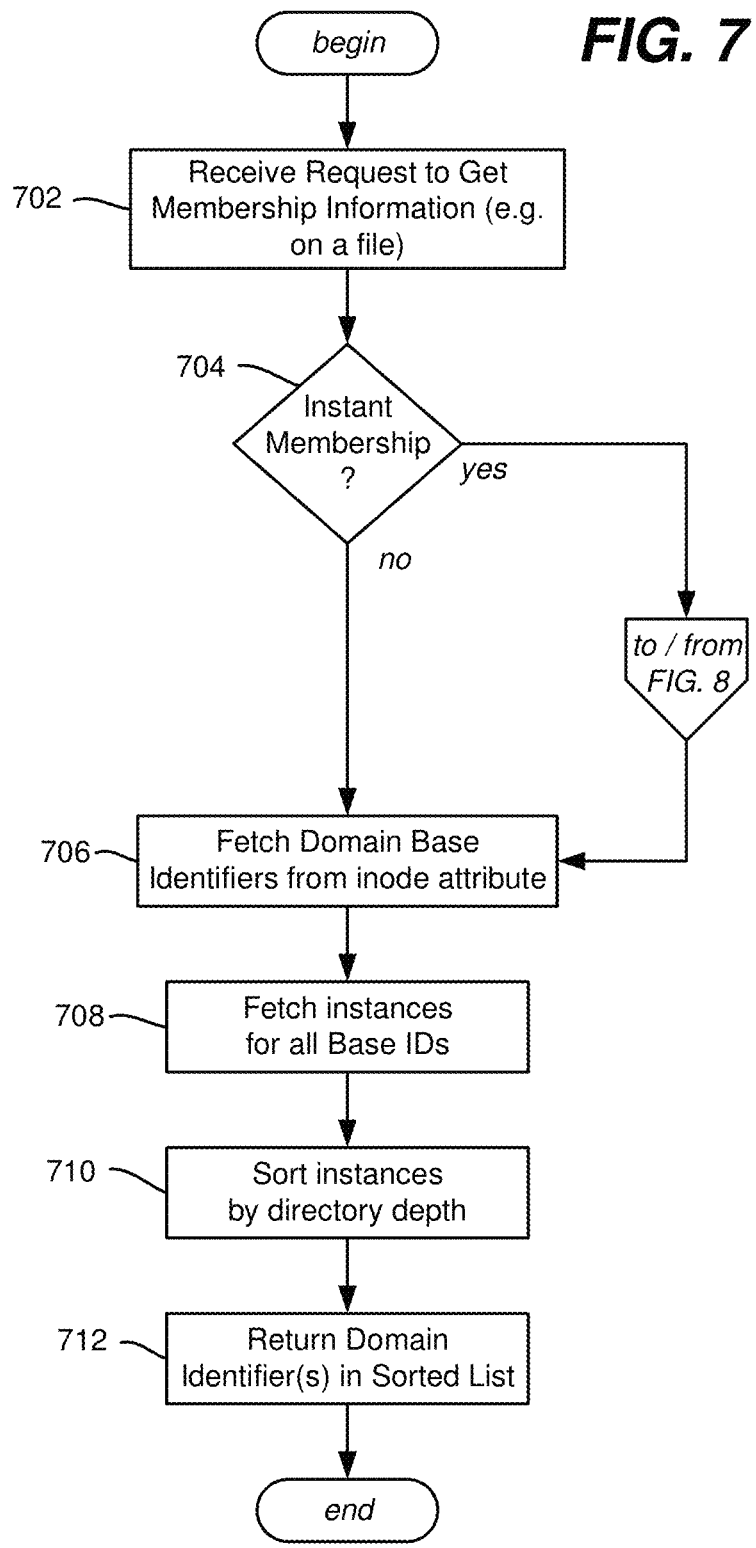
FIGS. 7 and 8 comprise a flow diagram showing example operations related to returning domain membership information to a requesting entity, in accordance with various aspects and implementations of the subject disclosure.
Figure 8:
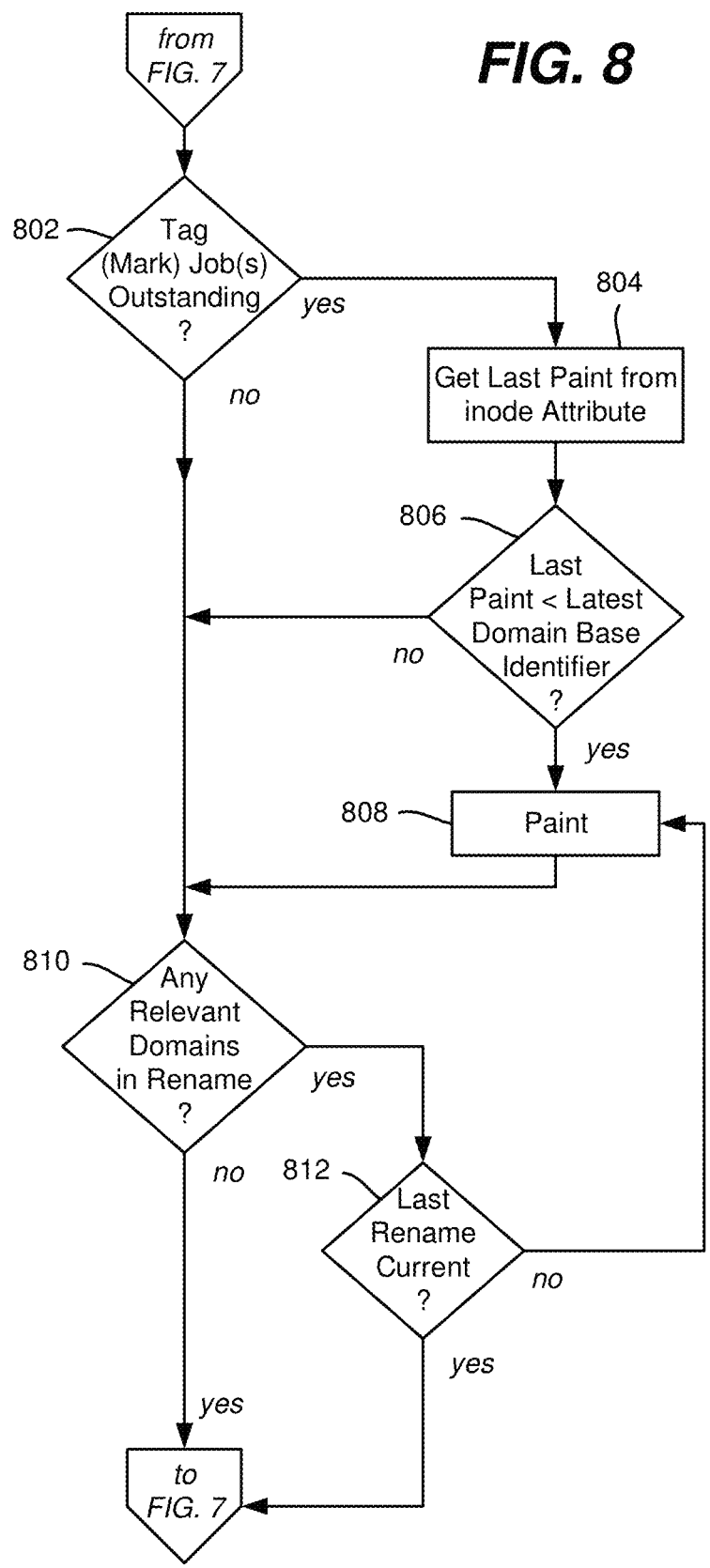

More particularly, when the membership for a file object needs to be obtained, usually in the context of a filesystem operation and a patron request, the operations shown in FIGS. 7 and 8 are performed in one or more implementations. Operation 702 represents receiving the request to get the membership information. Operation 704 evaluates whether the requesting patron needs instant membership information; typically this is the situation, and thus in one or more implementations, operation 704 need not actually perform an evaluation, and instead the process can directly continue at operation 802 of FIG. 8 (the "yes" branch can be automatically taken). For now, consider that instant membership information is not needed, or the operations of FIG. 8 are performed to verify that domain membership is up to date and/or make the domain membership up to date as described below, whereby the process continues at operation 706.

Operation 706 retrieves the base domain identifiers from the inode's domain attribute, and operation 708 retrieves the associated domain instances from the SBT. Operation 710 sorts the instances by the relative directory depths (DomBE's depth field) to allow the caller to determine nested domain hierarchy. Operation 712 returns the sorted list to the caller.

Returning to the concept of instant membership, if a patron or domain operation needs instant domain membership information, such as for a snapshot patron or a nesting check (described below) during domain creation, then the domain manager can determine if the inode's membership information is up to date, and if not, paint (walk up the parent chain to figure out properties of the parent chain) as appropriate to update the domain membership information. Example operations are summarized in FIG. 8, beginning at operation 802 of FIG. 8, which evaluates whether one or more tag jobs are outstanding. If so, operation 804 obtains a last paint (a counter) value from the file's inode, which, along with operation 806, determine if the last paint value is current. If not, operation 808 paints as described herein, that is, walks up the parent path until an up-to-date node is found with respect to domain membership information, and thereby is used to update the domain membership information of the file object. Additional details of painting are described herein with reference to FIG. 9.

If there are no tag jobs outstanding, or if the node had up-to-date membership information at operation 806 (or now has up-to-date membership information following painting at operation 808), operation 810 is performed. Operation 810 evaluates whether there are any relevant domains undergoing a rename process (described below). If so, operation 812 evaluates whether the last rename is current, and if not, branches to operation 808 to paint. The process repeats as needed until there are no relevant domains in a rename state and/or the last rename is current, and returns to operation 706 of FIG. 7 as described above.

Additional details with respect to instant membership include, in one or more implementations, that a structure is stored (e.g., as the first entry) in the SBT recording the global state of the domain manager. If there are no outstanding tagging jobs to be completed, then it is assumed that every inode on the filesystem is up to date and can just return the current set of domain identifiers set on the Domain Attribute. If instead there are outstanding tagging jobs, then another "last paint" inode attribute is used to record the last time the domain membership was last updated on the inode. If the attribute does not exist or the attribute's global ID value is less than the global last base ID value, which is changed when creating a new DomBE, then it is assumed the membership on the inode is out of date. If the domain membership information is out of date, then a painting operation is performed to update the membership immediately before returning the list of domains of which the file object is a member.

If the inode's last paint global value is current, the associated "rename" flags are checked to determine whether any sub-directories in their domains have been renamed to a location outside the domain. If so, a rename generation number is checked against the global rename generation counter. If the last paint value is out of date, the inode undergoes a painting operation to update the membership of the file object. Once the painting has been done, the instances are fetched from the SBT, sorted by depth and returned to the caller.

For root directory domains, an exception can exist, as it can be assumed that files in the filesystem are members of any root directory domains. Thus, when domain membership information is fetched, instances for the root directory are also to be fetched. The base domain identifier for the root domains is 0.0000, which means that domain instances created on the root directory do not need to tag any files within the filesystem and are always "tagged" and "ready". For subdirectories to have policies different from the policies defined in the root domain, such subdirectories need to override the policies with a new domain instance or create an "exclusion" instance (described below) that applies to a root domain instance.

When a domain instance is deleted, the SBT entry for the instance is (virtually) immediately deleted and a domain tag job is queued in the persistent queue to delete other SBT entries that may exist for that instance. The reference count in the corresponding DomBE is decremented. As the DomBE has a reference for the owning root directory, a DomBE will be removed when the owning directory itself is removed. This has a number of advantages, including that if an instance is removed and then another instance is created, a domain tag job is not needed to be started, as the membership is always up-to-date. Further, untagging is not needed, because the owning directory itself has to be empty before it can be removed. This further avoids cross tree-walking of a tag/untag job on the same directory being started shortly after one another, with associated persistent queue and job engine management.

Domains interact with filesystem operations at various points, including painting (e.g., operation 808 of FIG. 8) as described above, that is, when current membership information is needed for a file object in a domain that is still being tagged due to domain creation and/or a rename across domains. For filesystem operations this can include creating a non-nestable domain instance in which the new domain is being created in another domain that is still being tagged; in preparation for a rename operation (described below); and during modification to files where a patron requires accurate and current membership information. The concept of painting generally relates to snapshots, which can walk the inode's parent chain to figure out whether to snapshot a file object. The painting operation for domains works with the base domain identifiers.

Note that painting can be done in one or two passes for a single membership check, e.g., one pass for a domain still in the tagging state, and/or another pass if any of the domains of which the inode is a member is in a rename state.

Figure 9:
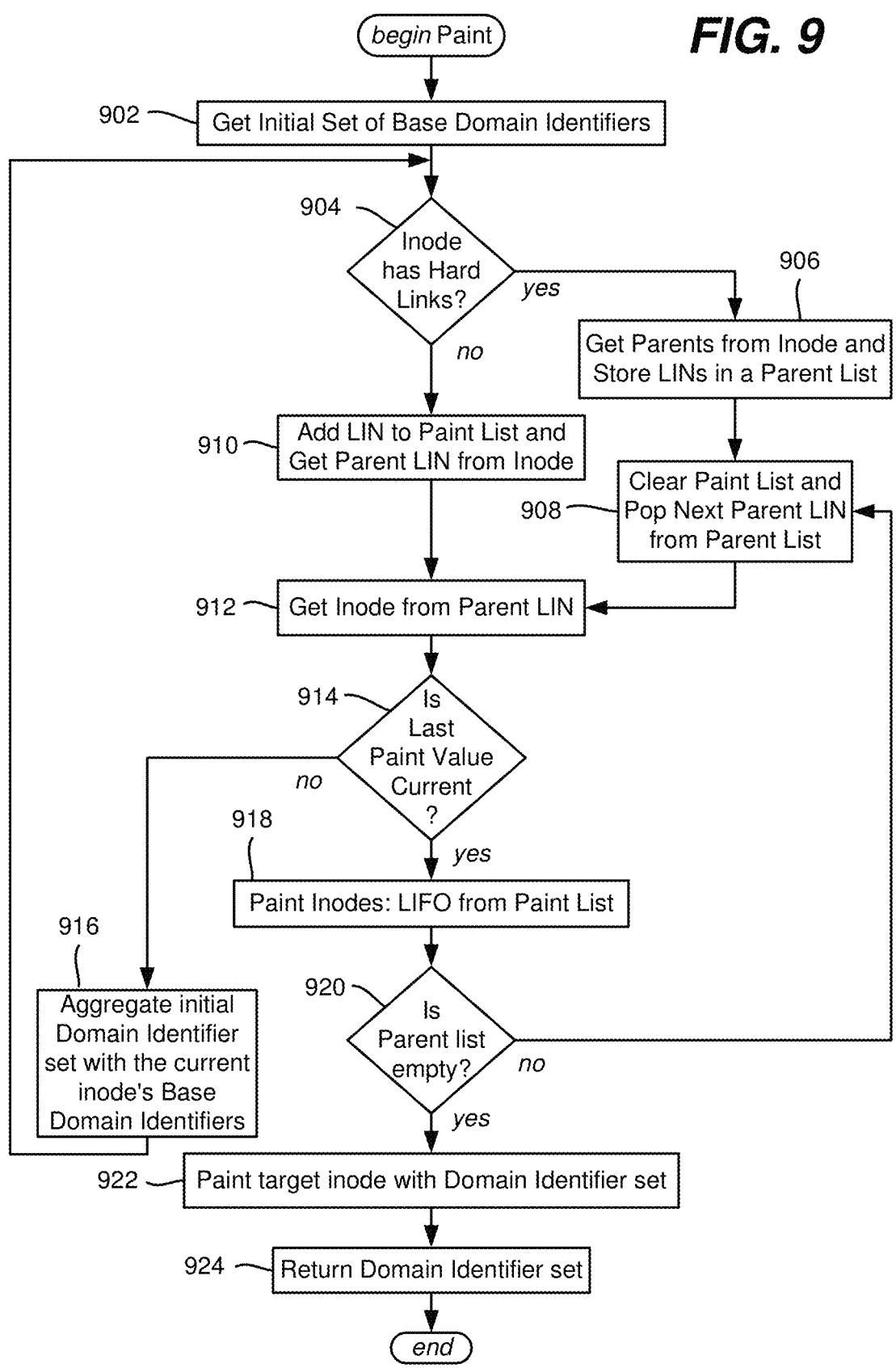
FIG. 9 is flow diagram representation example operations of painting attribute information with respect to domains, in accordance with various aspects and implementations of the subject disclosure.
Figure 10:
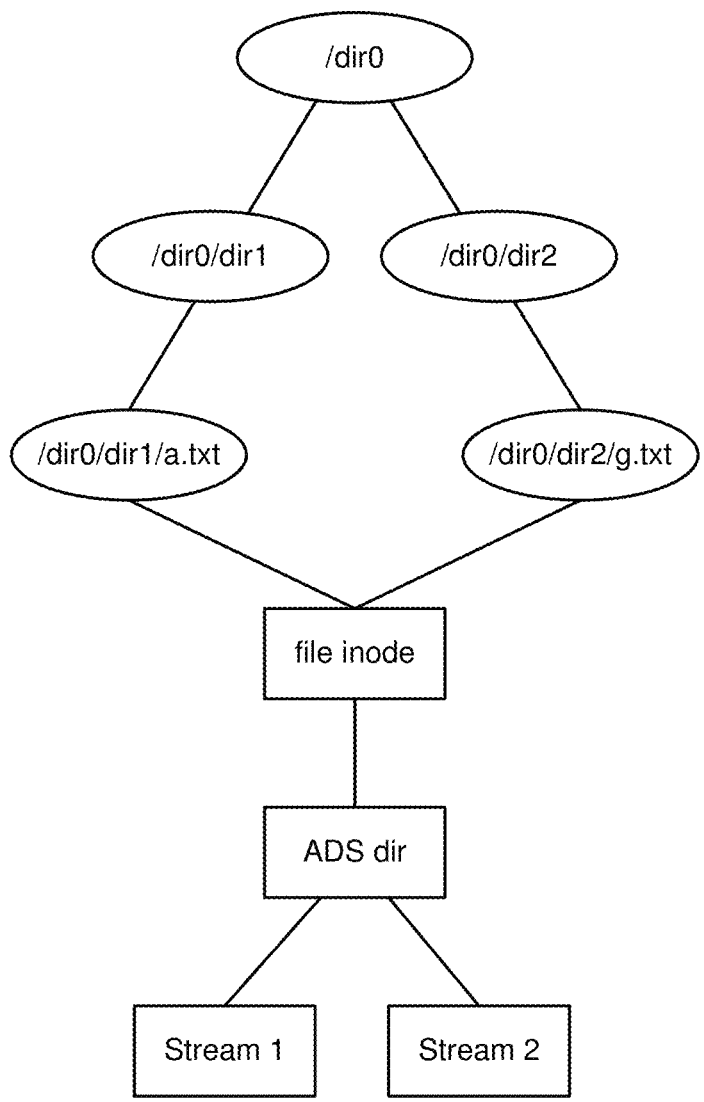
FIG. 10 is an example representation of paint paths relative to domains, in accordance with various aspects and implementations of the subject disclosure.

FIG. 9 shows additional details of example painting operations, including walking up the parent tree, where "up" refers to traversing the path from the target inode (the target inode refers to the inode for which instant-membership information is being fetched)) towards the root directory, which can be done utilizing shared locks. FIG. 10 shows an example of such paths, including hard links ("hard links" refer to a scenario where a file has more than one path reference to it from multiple directories) and two alternate data streams.

In general, painting comprises a process used by various modules to walk up their ancestor chain to figure out what policies apply to them. This is costly in real time and deadlock prone. Domains uses painting occasionally, but cuts down on the impact of conventional painting because domains are created infrequently, so the information on a file's inode does not become stale easily. Further, domain creation triggers a background task (job) to update the inodes in the background, thus proactively updating membership in case of a domain create that can result in membership change. Still further, painting as described herein cuts down the number of affected files by updating the generation counter only for the ancestor of the domain root, whereby other files that do not share that ancestor, will not be affected.

After retrieving the initial set of base domain identifiers at operation 902, operation 904 checks for multiple hard links (there are multiple parents) to the inode, e.g., whether the inode is a directory or is a file with a link count that represents a hard link. If not, operation 910 adds the logical inode number (LIN) of the inode to a paint list, and gets the parent LIN form the node, where the paint list comprise a stack or other suitable data structure used to collect LINs for the traversal up the path, and then used for painting back down to, but not including the target inode; ("down" refers to the direction of the path from the root inode to the target inode).

If instead at operation 904 hard link(s) are detected, operation 904 branches to operation 906 to get the next parent logical inode number (LIN) and build a parent list to be used as to determine a next parent (operation 908) for use at operation 912. A parent list (e.g., a stack) is thus used if a file with multiple hard links is encountered, where the parent list stores a set of LINs for each parent inode, so that each parent path is followed to obtain complete domain membership information. Note that operation 908 also clears the paint list and pops a (first, and then next as needed) parent LIN from the stack.

Operation 912 fetches the LIN's inode, which is a parent inode. Operation 914 evaluates whether the inode's relevant last paint value (which records when an inode was last updated (relative to global ID or rename generation) so that path traversal need not always go back to the root inode) and if not, proceeds to painting (LIFO, last-in, first-out) at operation 918. Note that in one or more implementations, the root inode is always current, whereby the process will always stop traversing at the root inode. Otherwise, an end-of-traversal condition has occurred, and operation 916 aggregates the initial domain identifier set with the current inode's base domain identifiers and returns to operation 904; note that the domain identifier set comprises the full set of base domain identifiers found during the path traversal for target inode parents, and is used for painting the target inode and is used for the membership query result.

Operation 920 is performed to process any other parents until the parent list is empty, at which time operation 922 paints the target inode (merges in the inode's current domain membership for the final domain list for the target inode). Operation 924 returns the domain identifier set.

Note that a membership check can be done for an alternate data stream (ADS) which is a child of a file inode. This means that following operation 916, the hard link check in operation 904 is performed through each iteration; however a file with a link value greater than one can only occur once in the entire path traversal. In such a situation, the target inode comprises the file holding the ADS and subsequent walks need to start at the hard link file, and not the original ADS inode. In one alternative, ADS inodes can have the domain attributes set; in another alternative, the domain attributes can be fetched on demand from the owning file inode. Note that the tree-walk job engine module does not traverse alternate data streams.

With respect to painting the domains back down the walked path, once the parent tree has been walked, the domain manager attempts to paint the updated domain information back to the inodes in the paint list. The domain manager starts painting at the inode closest to the root and works back towards the target inode. The painting down direction acquires the exclusive locks in the same order as a lookup operation takes locks, which prevents deadlocks with lookups. As the paint starts near the top of the directory tree, the domain set for painting is rebuilt from the start within the painting operation and then discarded at the end.

Because the walk up operations result in a full list of domains the traversal has encountered being maintained, failing to acquire a write lock will not stop the membership gathering operation. Thus, for painting back domain membership, with a new empty domain set, the process fetches the domain set from the inode at which the parent walk has stopped. This will be current, as it is either the root inode or has current membership information. The process open the next inode from the LIN paint list generated during the parent walk with an exclusive lock; if the inode cannot be opened, the painting operation stops. The process fetches the inode's relevant last paint value and makes sure the value has not been updated during the walk; if the value is current, painting stops. The process gets the inode's domain membership information and adds the membership information it to the domain set. In a transaction, the process writes the domain set and current global value to the inode in the appropriate attributes. The process returns to open the next inode, and so on, until the paint list is empty.

If hard links are encountered during the parent tree walk, a list of parents is saved in a parent list. Painting traverses each parent path to get the full domain membership for the target inode. To continue gathering domain membership information from the next parent in the parent list, the process clears the paint list, pops the next parent LIN from the parent list and returns to attempt to operation 912 of FIG. 9 (walk up the parent tree) as described above". Hard links should only ever be encountered once during a full traversal.

When an inode is created for a file, directory or alternate data stream in the filesystem, the inode immediately inherits any domain identifiers from its parent domain attributes. The last paint value attribute is also copied from the parent. Painting does not occur for the parent unless it is in a domain that has an instance needing instant membership at a time during which the domain is still being tagged.

If a hard link is created to an existing file, the hard link also adds the domain membership set from the new parent to the existing set of domains on the file's domain attribute. The last paint value is not copied in this case. Symbolic links are a form of inode creation and follow the inode creation operations.

With respect to unlink of a link, when a file object is deleted, first, before a transaction is started, the domain manager is notified. If there are any outstanding tagging operations, and there is in a domain where a patron requires instant membership information, the domain manager performs a painting operation. If the file object that is unlinked is the owning directory for a domain, then the reference count for the DomBE is decremented; if zero, the DomBE and the domain instances are deleted from the SBT. The base entry can be deleted as part of the unlink transaction, and the removal of the instances and associated SBT sub-keys for the instances can be queued for processing by the domain tag job.

Optimizations to reduce painting are feasible, to minimize the impact of painting due to an instant ready domain. As one example, pending tag jobs sometimes can be combined into a single task. Further, a last paint ID attribute can be set on a file to indicate when it was last painted in relation to domain creation; this will allow a file to stop painting once its domain information is current. A last rename id attribute can be set on a file to indicate when it was last painted in relation to a rename requiring painting; this value may be compared against a per-domain rename identifier which is monotonically incremented whenever a rename affects a domain. The monotonic counter can also be made global. Opportunistic paint down also can paint down on the directory tree; although not strictly necessary as the domain tag job will eventually catch up, with a large dataset and a lengthy domain tag job, opportunistic paint down can help.

The first file in any domain that hits a directory which is not nested under the new domain gets tagged with updated last paint. The rest of the files in that domain do not need to paint, even if their last paint attribute is not valid. Also, an asynchronous process proactively can paint domains roots, thus figuring out which domains are not nested under the new domain.

The files in the sub-tree affected by the new domain will still need to use the on inode last paint attribute to stop painting. Any sub-domains will need to continue to paint unless the files in the sub-domains have an up-to-date last paint attribute. This allows domain membership information to be used to limit painting; the global impact is minimal.

Directories can be tagged, on the assumption that in a typical dataset the number of files vastly outnumbers the number of directories. This will allow a file to get its membership from its immediate parent.

Turning to aspects related to patrons and patron instance data, a patron needs to be able to read and write data related to the domain instance with which the patron is operating. As described above with reference to FIGS. 3 and 4, a separate sub-key is defined to store data for a domain instance; the domain manager supports reading and writing of instance data of up to a limit (e.g., 1 MB in one or more implantations). In general, patron implementations only use instance data to store data that will be used during kernel filesystem operations; other miscellaneous data is stored in another location as determined by the patron implementation.

A patron implementation hooks into the filesystem at various points to perform the patron's specified functionality. A typical workflow for a patron is to use a filesystem hook, and get the patron specific domain membership of the file object(s) being used (or return if there are no domain instances).

By way of an example, a WORM (write once, read many) patron intercepts any modifications to the filesystem, such as the write path, rename, unlink, setattr, etc., to prevent the modifications if required. The WORM patron queries the inode(s) being modified for their domain membership, as filtered by the WORM patron. If an instance exists, the policies from the domain manager are fetched for that instance. If the policy states the inode(s) about to be modified cannot be modified (that is has been committed and is still within the retention period), the WORM patron blocks the modification (an returns an error code or the like).

As described herein, the domain manager provides a function to retrieve an inode's domain membership information (e.g., domain membership set) that is filtered for a specific patron. If needed, a patron fetches the instance data from the domain manager. The patron performs whatever operation is needed, and then, as needed, writes any instance data using the domain manager.

More particularly, patron hooks need to know whether, and if so which, domain instances apply to an inode during a filesystem operation. As described with reference to FIGS. 7 and 8, the membership query function fetches the base domain identifiers from the inode's domain attribute, checks if painting is required, and if so, performs a painting operation. The query function of the domain manager fetches the associated domain instances from the SBT, and removes the instances that do not apply to the requesting patron. The function sorts the instances by the relative directory depths (DomBE's depth field) to allow the caller to determine nested domain hierarchy. The function then returns the sorted list to the caller. Note that if no patron type is supplied to the function, no domain instances are removed and all domain instances are returned.

Patrons have properties that define how various patron instances interact with each other as well as other filesystem operations. Patron properties are fixed and cannot be changed (immutable). A patron registers itself with flags or the like that define their properties, including property flags for instant (or not), nesting (or not), exclusions (or not), allowing or denying path rename, and whether or not hard links are allowed).

The instant property defines whether the membership for instances of the patron needs to be instantly available or not when the membership is fetched for a file object inside the domain before the domain tag job tags it. If this flag is set and any instances of this patron are undergoing a tagging operation (either for domain creation or rename), then a paint operation needs to be performed. If none of the domains undergoing a tagging operation have instances with this flag set, then painting will not occur.

The nesting property defines whether an instance of a patron can be created within an existing domain instance with the same patron or above it where the existing instance will be within the new instance. When a domain instance is created for the patron, the domain manager checks the patron's nesting property and will disallow the creation of nested domains (described below) if the property is not set.

The exclusions property defines whether the patron allows exclusions to be created or not. Exclusions are special domain instances that apply to another instance in which the exclusion is created. The inodes are tagged with both the original base domain identifier as well as the base domain identifier for the exclusion instance. The domain manager automatically applies the exclusion before returning the membership set for an inode. As exclusions are a domain instance, they can share the same DomBE as other normal domain instances and benefit from all of the advantages that DomBEs provide. Exclusions are primarily applicable to non-nestable domains.

The deny path rename property defines whether the path leading up to the domain is allowed to be renamed or not. If a domain instance exists with the corresponding patron's deny path rename property set to true, then attempting to rename the path components leading up to the domain's owning directory is denied. This property is appropriate for WORM domain instances.

The no hard links property defines whether hard links to a file across the domain boundary are permitted or not.

Callbacks are implemented for patrons. This allows patrons to handle domain events such as when an inode's membership is updated, and when a domain's state changes. For example, when a new file object is created, a create inode callback is sent to registered patrons before the inode is created to a directory format manager, with a parameter that contains the parent directory for the new inode. This callback can also be triggered when an ADS directory is created, and in this scenario, the "parent" can be a file or directory. Note that before the create inode callback, a transaction has been started, an inode has been created, but may not be fully configured, and the parent has been added to the transaction. When the inode creation transaction is about to be completed, a transaction commit callback is issued.

When an inode is to be unlinked, a transaction is created and the inode to be unlinked and the parent inode are added to the transaction. Then the domain manager is notified. The domain manager in turn notifies the patrons to check whether the inode can be unlinked through an unlink allowed callback, passing in the parent directory for the inode. If the patrons agree, the registered patrons then get an "on unlink" callback, supplying the inode being unlinked as well as the parent directory. It is possible for the "on unlink" callback to be called with different domain identifiers, as a new domain may exist on the inode being unlinked.

Metadata callbacks described above finish with a transaction commit callback, which is issued just before the transaction is to be committed. If the operation has failed or is to be aborted, this callback will still be issued but with a success parameter will be set to false. Patrons can use this to clean-up any temporary structures and state that were created during the initial metadata operation callback. The metadata callback's ID will be the same as the transaction pointer in this callback.

An "on tag" callback is issued when inodes are tagged with the base domain identifier during the domain tag job. This can be triggered by a domain creation or rename operation. No corresponding transaction commit callback is issued, but this is called during the tagging transaction.

When a tagging operation has been completed for a domain and no external hard links were found, a "ready" callback is issued to registered patrons. This is called in the context of a transaction that is updating the DomBE in the SBT for the corresponding domain.

As described herein, a domain tag job is implemented in the job engine to update the membership by tagging inodes in the domains, e.g., using a tree-walk library. Modes need to be tagged when a domain instance is created in an existing directory that has never had a domain before, and when a directory is renamed in or out of an existing domain. The domain tag job reads the actions to perform from the persistent queue. A job coordinator sets an in-progress indicator on the state field in the persistent queue entry (e.g. on a Job ID). If the job coordinator finds that the in-progress indicator is already set to a different Job ID and that Job ID is cancelled or failed, the coordinator updates the indicator. If the in-progress is already set to an active job, the coordinator cancels current job. Once a job is complete, the domain's state is updated to ready and the persistent queue entry is removed. Note that the domain tag job should tag ADS files, e.g. for snapshots, otherwise an ADS file would need to paint to get domain tag membership from the parent file. As described above, when a domain instance is created on a root directory, it is assumed be created instantaneously and saved on every file in the system without a need to tag every file. When the tree walk finishes, the job sets the DomBE's ready property to true. To clear the tagging bit, the job looks up the base domain identifier key in the persistent queue, and if they are no more requests, clears the tagging bit while holding the domain persistent queue lock.

A domain daemon reads the domain persistent queue (e.g., at fixed intervals) and starts the domain tag job if there are any entries in it. The daemon's logic can be straightforward, e.g., the daemon can be only responsible for polling the persistent queue and starting the domain tag job.

Caching of domain information can be used so that domains do not adversely impact the operation of filesystem operations. A generic domain cache can be implemented, as well as an instance membership cache attached to inodes in the system. For example, a domain cache can be implemented as an in-memory read-through cache over the IFS Domains SBT. Domain cache invalidation can be achieved through global per-domain locks or using existing metadata server block locks from the SBT. The cache can be tagged against the base entry (which is noted on the inode attribute) and can pre-fetch associated domain instances and instance data. The cache may also record exclusion instance child-parent relation-ships. A Domain operation such as creation or deletion acquires the domain locks and invalidates the cache. If the cache is found missing in the I/O path, the first miss gets the shared lock and reads the entries from SBT. Instance data modification invalidates only the private blob for that patron's instance. This may be achieved by locking the base domain in shared mode and the patron's instance in exclusive mode (not possible with metadata server locks), in a way that avoids locking every instance in the I/O path A membership cache can be used, in that domain membership for an inode is normally fetched in the context of a filesystem operation, and each patron needs to obtain relevant membership information for the inodes involved in the operation. Several patrons can be involved in a single operation, each with one or more calls into the patron to perform various tasks. Obtaining membership is a common operation for IFS Domains, and sometimes after fetching the membership information, a patron will not do anything. By storing membership information in the inode, fetched on demand, domains can minimize the impact for every patron that requires membership information during a filesystem operation. The membership information can be an array of domain identifier instances. Patrons that do finding instances corresponding to work can then perform operations via the domain cache.

Note that denying path rename is available for a patron. In this way, the path leading to the domain instances cannot be renamed. To protect the paths to the domain instances, each directory has an inode attribute to track the instances. Instead of tracking each instance in the attribute, a reference count can be used in association with the patron that minimizes the size of the attribute in the inode. If the attribute exists and has a non-zero reference count, then the directory entry cannot be renamed.

Some patrons require that their instances cannot be nested within each other. During domain creation, if the patron disallows nesting, the operations check there are no domain instances above or below the directory with the same patron. Domain nesting can occur when a domain is created in a child directory of an existing domain, and when a domain is created in a parent directory of an existing domain. In a first scenario, the check is performed by checking the child directory's domain membership (painting if required). If the patron of the domain instance to be created is non-nestable and the directory is already a member of the same patron, then the domain creation will be denied. In a second scenario, an ancestor inode attribute (a dynamic inode attribute set on the path leading to the root of a domain) is utilized to check if there are any descendants that own a domain instance of the non-nestable patron. This means that not only patrons with the deny path rename property set will tag the path leading to the domain, but also any non-nestable patrons. This latter scenario is the reason for having a reference count for each patron type rather than an array of all domain instances in the ancestor attribute.

Turning to the concept of exclusions, some patrons (e.g., snapshots, partitioned performance (used to regulated the I/O rates on various areas of the filesystem) and deduplication) can benefit from having one or more subdirectories within a domain instance excluded from that domain's membership. For nestable patrons, this can be achieved by creating a child domain instance that overrides the parent's instance. For non-nestable patrons to implement exclusions, an exclusion domain instance can be created that excludes a domain from another (e.g., parent) domain instance. Exclusion instances can be created and deleted like a regular domain instances, which allows other regular instances to use the same DomBE as the exclusion instance.

Exclusions are tracked per data service/domain patron. In this way, a quota data service can exclude different folders relative to the folders excluded by a snapshot patron, and so on. The private data service metadata in the SBT can be used for separately tracking exclusions.

In one implementation, the domain manager automatically applies exclusions when a client requests the membership for a file object. For example, if a file has a domain membership set of [2, 6, 14, 17] and instance 17 is an exclusion to instance 6, the domain manager will automatically apply the exclusions and return the membership set [2, 14] to the caller. This can be done via a parent-child relationship.

To track the relationship between domain instances and the exclusions, a data structure in the domain instance's metadata can be used for each domain instance and exclusion instance in the SBT. Note that although not explicitly shown, part of the structure tracks the size of the domain identifiers array in the SBT entry, while a count value specifies the number of valid domain identifiers that are set in the array.

When an exclusion is added to a domain instance, (in a transaction) the domain manager creates an exclusion instance with the appropriate patron with a corresponding domain entry structure in the SBT (if it does not yet exist for that directory). The domain identifier for the domain instance is added into the exclusion's domain identifiers array, maintaining the size and count appropriately, and the transaction is committed the transaction. Patron implementations are able to read and write data to the exclusion instance to manage how the exclusions will be applied to the domain instance to which the exclusion applies.

To remove an exclusion, the exclusion domain identifier is removed from the domain instance entry and the exclusion instance entry has the applicable domain identifier removed as well. If the exclusion instance's domain identifier count goes to zero, the exclusion instance can be removed from the SBT.

When a domain instance with exclusions is deleted, each of the exclusion instances has the deleted domain identifier removed as well. As with removing an exclusion, any exclusion instances that end up with a domain identifier count of zero, the exclusion instance is removed from the SBT as well.

Note that nesting snapshots need nestable exclusions for regular usage that are not directly supported by domains. More particularly, exclusions need to be possible in different snapshots, where one exclusion is a descendant of the other exclusion. For example, consider that a first snapshot policy is to take a weekly snapshot of dir/data/foo but exclude dir/data/foo/temp. However, a second snapshot policy is to take a monthly snapshot of dir/data/foo that also includes dir/data/foo/temp.

To this end, the domain manager and/or the snapshot data service adds a level of indirection, and binds sets of exclusions to various domains. Membership issues are handled in the same fashion as nestable domains generally handle them, that is, by computing membership as a Boolean relationship between the inclusions to which an entity belongs and the exclusions to which the entity is excluded. To be a member of a snapshot, a file needs to be in an inclusion.

Another aspect is isolation. Consider that multiple snapshot clients (e.g., synqIQ, an application that allows replication between clusters, and Network Data Management Protocol) use the same domain instance for a directory but also want to have different exclusions. The exclusions can be per instance. For example, when user 1 creates a snapshot at foo/dir with exclusion at foo/dir/tmp and then user2 creates a snapshot at foo/dir with an exclusion at foo/dir/dir2/tmp, these two exclusions are separate, even though the domain instance for the snapshots at foo/dir is always the same. At a high level, the snapshot exclusions are implemented as a set of domains, comprising one domain for each unique subtree in the namespace. Each snapshot exclusion is per SnapID, with its mapping stored in patron data on disk (in the SBT) bound to the exclusion domain for the directory to which it applies. Interfaces allow setting and retrieve these mappings, whereby the snapshot subsystem can consume this data when making membership decisions in the copy-on-write path and also in the snapshot namespace path.

Consider that a snapshot policy (e.g., for a user/or the weekly policy for a set of files) gets back domain D1, D2 and D3 as the membership information for a given file object. This particular policy applies the exclusion instance D3 (which identifies SnapID2 and SnapID3) to the domain D2, which identifies SnapID1, SnapID2, SnapID3, SnapID4 and SnapID5. After applying the exclusion, the snapshot policy thus deals with only SnapID1, SnapID4 and SnapID5. A different policy (e.g., for a differently user/or the monthly policy for a set of files) can choose to not apply the exclusion instance, and thus deal with SnapID1, SnapID2, SnapID3, SnapID4 and SnapID5.

Turning to aspects related to domains-based snapshots, prior snapshot technology Is based on snapshot painting. With domains, creating a new snapshot on a domain that is fully tagged will not cause further "painting" operations, so a lot of the performance impact caused by taking a new snapshot is avoided. Additionally, domains brings other benefits, such as better management of snapshot IDs, reduced number of operations needed to resolve snapshot governance (which snapshots apply to a file object), and the ability to implement exclusion of sub-directories from a snapshot.

With respect to snapshot painting, as described herein, walking up the parent chain to figure out snapshot-related information is no longer needed once domain-based snapshots are in place. Note that the concept of painting is used by domains, but this is independent of snapshots.

In general, snapshots comprises a feature that allows users to create a point-in-time view of any directory tree in the system. The user needs to specify the root of the snapshotted directory and snapshot name. The snapshot root can be anywhere in the filesystem and may be nested within/above other snapshotted roots. Snapshots are exposed to users as the name provided by the user; but internally they are tracked using a system-generated "SnapID", which is a filesystem-unique numerical identifier of snapshots used internally by the filesystem; SnapIDs are assigned to a new snapshot from a monotonically increasing global counter In order to preserve a snapshot's view of (each filesystem object under) the directory tree, the filesystem creates a snapshot version of every affected file object upon modification, and then copies (i.e. "Copy-on-Write" or "COWs") the changed data from the "HEAD" version to the latest snapshot version. In other words, if a new snapshot has been taken on a file's directory tree since the file's previous modification, the filesystem needs to create a snapshot version of that file. As an optimization, if multiple snapshots were taken since the previous modification, only one snapshot version of the file needs to be created and tagged with all the new SnapIDs since the previous modification. Thus, at the time of creating the snapshot version a file needs two data points, a first of which is directed to a determination as to whether there been a snapshot taken since the last time it was modified; this is achieved by maintaining a per-file attribute (called LASTPAINT) which is always updated to the global SnapID at the time of last modification. Another data point corresponds to a determination as to what set of SnapIDs that affect (or "govern") this file. Because users may snapshot any directory, any file being modified needs a mechanism to figure out if it belongs to a snapshotted directory tree (and what those SnapIDs are).

When a snapshot is created on a directory, its SnapID is added to an attribute called "SNAPIDS" on that directory. In one implementation, "SNAPIDS" comprises an on-disk Inode attribute that represents the set of snapshots that govern a given file or directory; it may include SnapIDs "painted down" from ancestors. In prior systems, when a file is being modified, the modifying thread walks up the file's ancestor directory or directories to figure out if there are any new SnapIDs since the last modification. In a worst case, this thread has to go all the way up to the root of the filesystem. If it finds a new SnapID, it will create a snapshot version and note the new SnapIDs in the SNAPIDS attribute on the file. As an optimization, snapshot create will also attempt to update the SNAPIDS attribute of all the parent directories of the file being modified up to the root directory, so other files will find an updated SNAPIDS attribute without walking all the way to the snapshot's root. This prior process of finding and updating SNAPIDs is called snapshot "painting" with respect to snapshots. Additionally, after a file has painted, its LASTPAINT attribute is also updated. While painting provides the flexibility to create instant snapshots anytime, anywhere, it is an expensive operation that has to be performed on every relevant file, even if a file is not under snapshot control when a new snapshot is taken.

As described herein, domains is a system/service that allows consumers (also called "patrons") to specify groups of files (referred to as "domains") rooted on specific directories. and then resolve which files are members of these groups with an expected performance close to O(1) in a typical situation. In other words, with domains, the patrons can specify logical groups on specific directories and then resolve which files belong to these groups in a near-instantaneous fashion in a common case. Each domain is identified by a number called the "domain Identifier" or "domainID". The properties of the domains will be stored in the domain SBT, which maps domainIDs to their "Domain Private Data Blobs" specific to that instance of the domain. Domains provides a superior painting mechanism over the current snapshot implementation and also provides an infrastructure for better management of Snap IDs.

Figure 11:
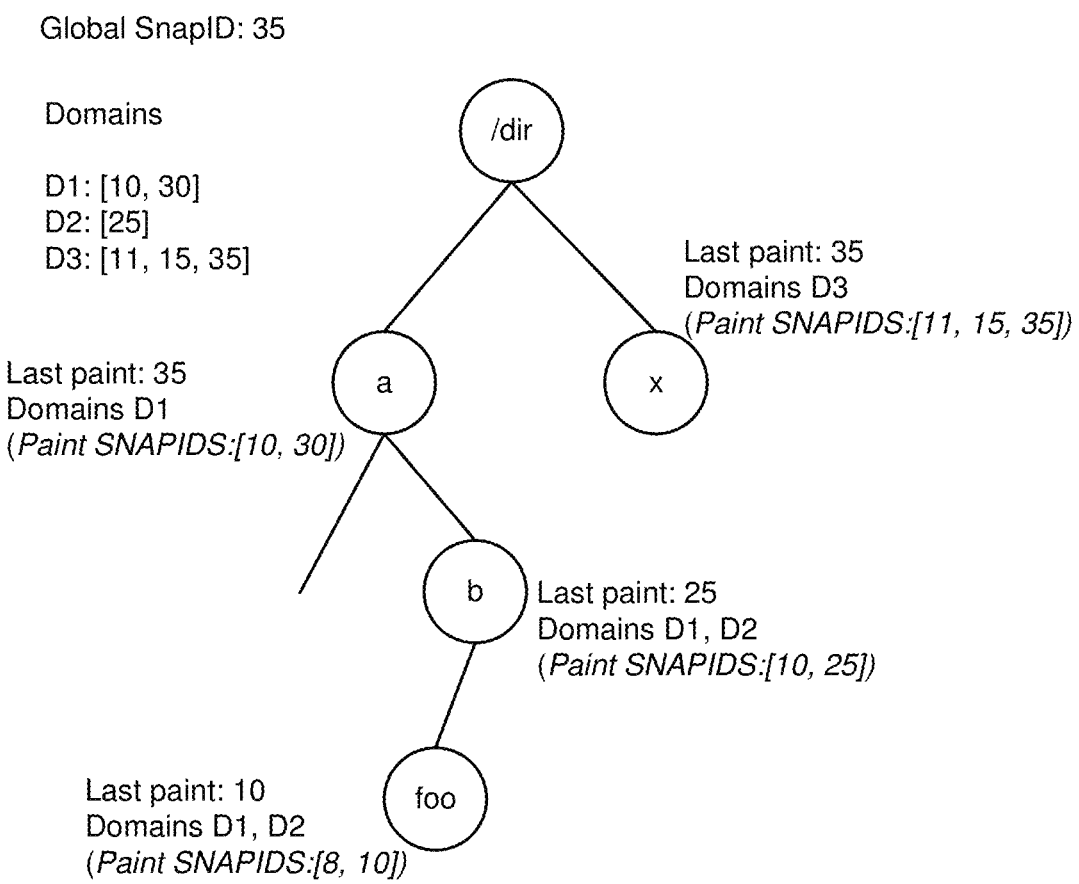
FIG. 11 is an example representation of a directory tree structure above a file, demonstrating how domain-based snapshots are more efficient than prior painting methods, in accordance with various aspects and implementations of the subject disclosure.

By way of an example of membership resolution, consider a tree, such as shown in FIG. 11, with directories that lead to a file named "foo" in this example. Each directory/file has a SNAPIDS attribute (which may contain a list of stale snapshot IDs) along with the "Last Paint ID" value, which stores, for each Inode, when was the last relative "time" it was painted. A "global snapshot ID" is also known, which in this example equals 35.

In this example, when the file foo is about to be written and needs to check whether it has to Copy-on-Write (COW) or not, in prior (paint) snapshot technology, the process/file foo recognizes that its last paint ID (e.g., 10) is behind the global snapshot ID (e.g., 35), so the process needs to snapshot paint, that is, has to walk up the chain and check on a next higher parent directory e.g., the "b" directory. Directory "b" has a SNAPIDS attribute that contains a snapshot ID (e.g., 25) that was not stored in foo, so the process adds this value to the SNAPIDS attribute.

However, "b" has a last paint ID of 25 which is still behind the global snapshot ID of 35, so the process further walks up the chain and checks the "a" directory. On "a" another snapshot ID of 30, which was not stored in foo; however the last paint ID is the same as the global snapshot ID of 35. At this point, no more ancestors need to be checked, and the file foo is COW'ed with a snapshot range [25, 30]; (SNAPID_RANGE refers to an on-disk Inode attribute that stores the range of SnapIDs governing the file).

To illustrate what would happen in a domains-based implementation of snapshots as described herein, first note that the italicized "Paint SNAPIDS" attributes in FIG. 11 need not be present with domains. Thus, the same snapshot example is present, but instead of the SNAPIDS attribute, each directory/file shows the domains of which that directory/file is member. The snapshot IDs are stored with reference to each domain; e.g., the snapshot service data associated with domain "D3" contains snapshot IDs [11, 15, 35].

Consider that the file foo is written to and needs to figure out if it has to copy-on-write (COW). In this case, the process/foo recognizes that its last paint ID is behind the global snapshot ID; however, instead of walking up the directory chain, the process checks the domains of file foo, D1 and D2. As shown in FIG. 11, the domain identified by D1 contains snapshot IDs [10, 30] and the domain identified by D2 contains snapshot ID [25], so foo will copy-on-write with a range [25, 30] (because these are the snapshot IDs greater than foo's last paint ID). As can be seen, domains quickly determine the range without walking the parent path in a painting operation, thus providing a far more efficient snapshot-related operation.

The example of FIG. 11 assumes that the above domains have been fully marked. If this is not the case, domains will trigger its own internal painting to update the domain membership first as described above. Accordingly, there is still a possible scenario in which no files have been processed by the domain tag job. Domain painting only occurs rarely, e.g., once per domain creation on a snapshot root on, whereby future snapshots on the same root will not need to deal with domain painting operations.

To summarize, to implement snapshot with domains, a snapshot patron is provided. The snapshot domain instances store the SnapIDs associated with the domain in the snapshot instance data section, (thereby avoiding the need for the SNAPIDS attribute of the Mode). The snapshot system uses domains APIs to determine the set of Snapshot Domains applicable for the file, from which the set of SnapIDs is calculated; the SNAPID_RANGE attribute is updated using this information as well.

To figure out which snapshot IDs are governing a specific file during COW'ing, the system finds the domain IDs for the file and then reads the list of snapshot IDs from the domain data section (assuming that the file has been tagged/marked previously). Note that domains can implement a domains cache which caches the private instance data associated with a domain. Domain-based snapshots indirectly retrieve the set of Snap IDs from the domain cache, using the domains API.

The snapshot patron can be created with the following properties as described above, namely instant=true; nesting=true; exclusions=true; deny_path_rename=false; and no_hardlinks=false. The snapshot patron uses instant membership and relies on Domains' painting mechanism to resolve membership when the domain tagging job has not completed.

On a snapshot create, the snapshot patron uses the domains interface to create a domain on the specified path (or uses an existing snapshot domain if it exists). The Snap ID that is created is stored in the domain's instance data section. The SNAPIDS attribute is no longer updated on non-minisnap inodes (where minisnaps are directory snapshots created from the root of the filesystem to the directory on which the snapshot is to be created, which ensures that the snapshot can be reached from the root of the filesystem even if the path is modified in the future). Note that minisnaps are only created by snapshot create, and store the Snap ID value of the snapshot in the SNAPIDS attribute of the Mode. Minisnaps are not part of the snapshot domain and thus do not use Domains for membership. Minisnaps are not COW'ed on write.

Figure 12:
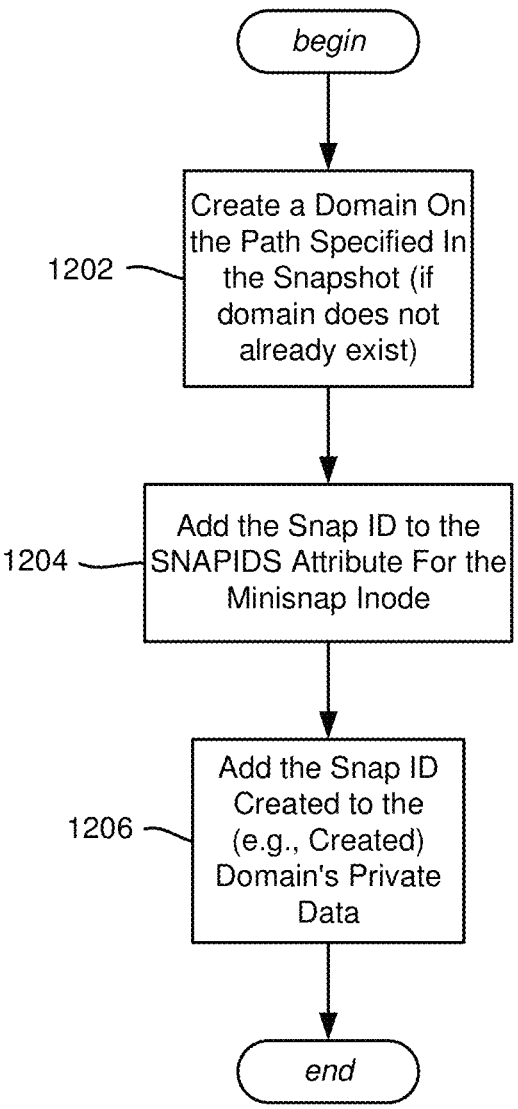
FIG. 12 is a flow diagram showing example operations related to domain-based snapshots, including creation of a snapshot domain, in accordance with various aspects and implementations of the subject disclosure.

The overall existing snapshot create implementation remains unchanged, other than the operations related to domains, which are represented in FIG. 12. Operation 1202 represents creating a domain on the path specified in the snapshot. Operation 1202 represents adding the Snap ID to the SNAPIDS attribute for the minisnap Inode, and operation 1204 represents adding the Snap ID created to the created domain's private data.

For deleting a snapshot, the snapshot delete job is divided into phases, one of which deletes LINs from snapshots. Because domain snapshots do not store the governance in the SNAPIDS attribute, snapshot delete does not need to update the attribute. In general, the handling of system snapshot delete remains as is in domains-based snapshots.

Figure 13:
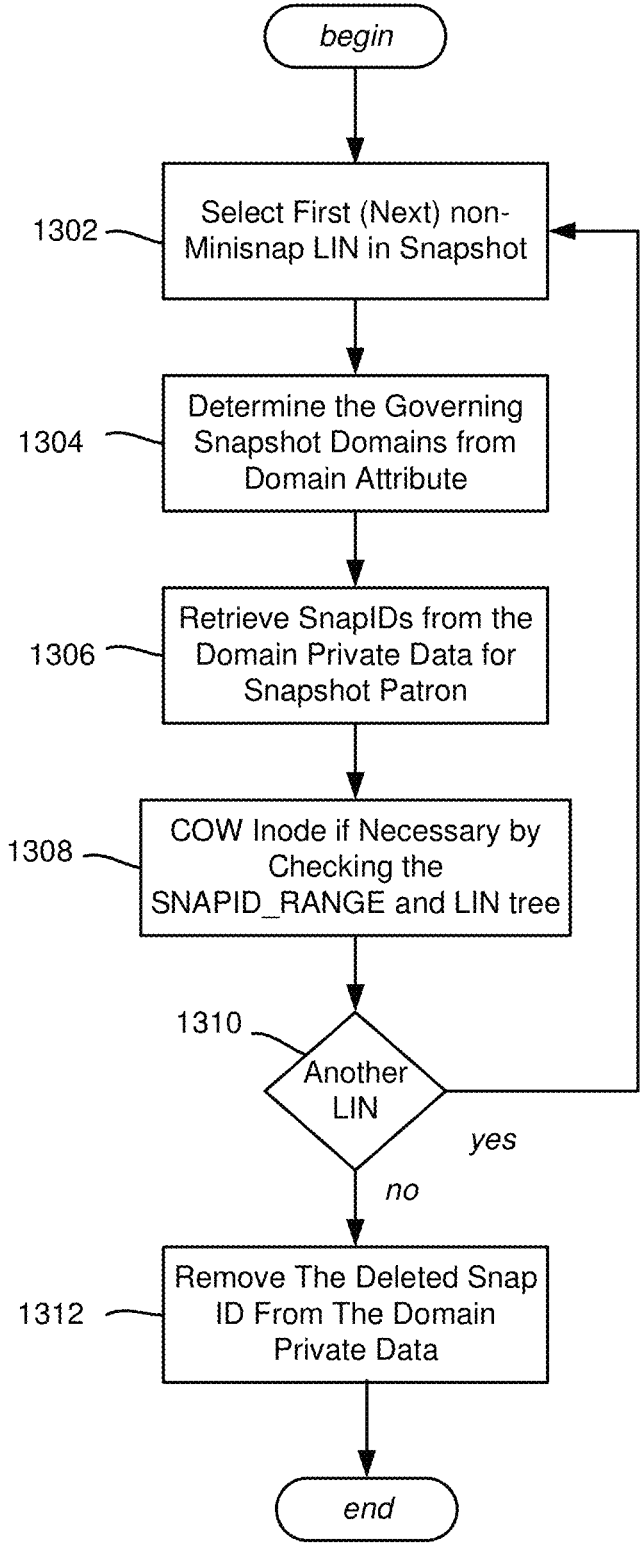
FIG. 13 is a flow diagram showing example operations related to snapshot delete with domain-based snapshots, in accordance with various aspects and implementations of the subject disclosure.

The delete LINs phase of the snapshot delete job deletes LINs COW-ed for the snapshot. The domains-based functionality for delete is represented in FIG. 13. In general, via operations 1302 and 1310, for each non-minisnap LIN in a snapshot (as determined from the snapshot tracking file; the snapshot tracking file comprises a metafile used to track snapshots, and is used for indicating which snapshots are active, store snapshot attributes (usage data, creation time) and to store the list of LINs modified in the snapshot), operation 1304 determines the governing snapshot domains from domain attribute. Operation 1306 retrieves the SnapIDs from the domain private data, and operation 1308 COWs the inode if necessary by checking the SNAPID_RANGE and LIN tree. Thereafter, operation 1312 removes the deleted Snap ID from the domain private data.

Figure 14:
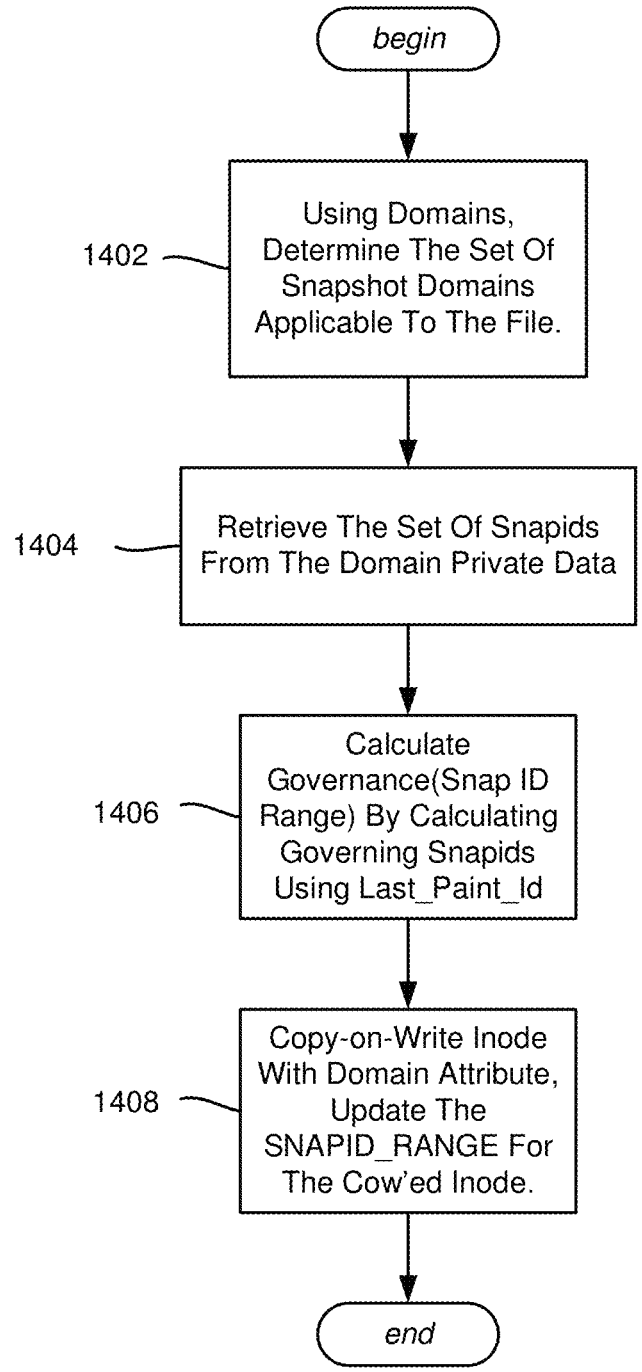
FIG. 14 is a flow diagram representing example operations related to copy-on-write behavior with domain-based snapshots, in accordance with various aspects and implementations of the subject disclosure.

Domains painting updates the set of domains applicable to the file if the domain has not been tagged completely. The behavior of skipping COW if last paint value equals the global snap ID, remains the same. The steps to determine when a file needs to COW the inode are represented in FIG. 14.

Operation 1402 represents, using domains, determining the set of snapshot domains applicable to the file. Operation 1404 retrieves the set of SnapIDs from the domain private data. Operation 1406 calculates the governance(Snap ID range) by calculating governing SnapIDs using Last_Paint_Id. Operation 1408 COWs the Inode with the domain attribute, and updates the SNAPID_RANGE for the COW'ed Inode.

Figure 15:
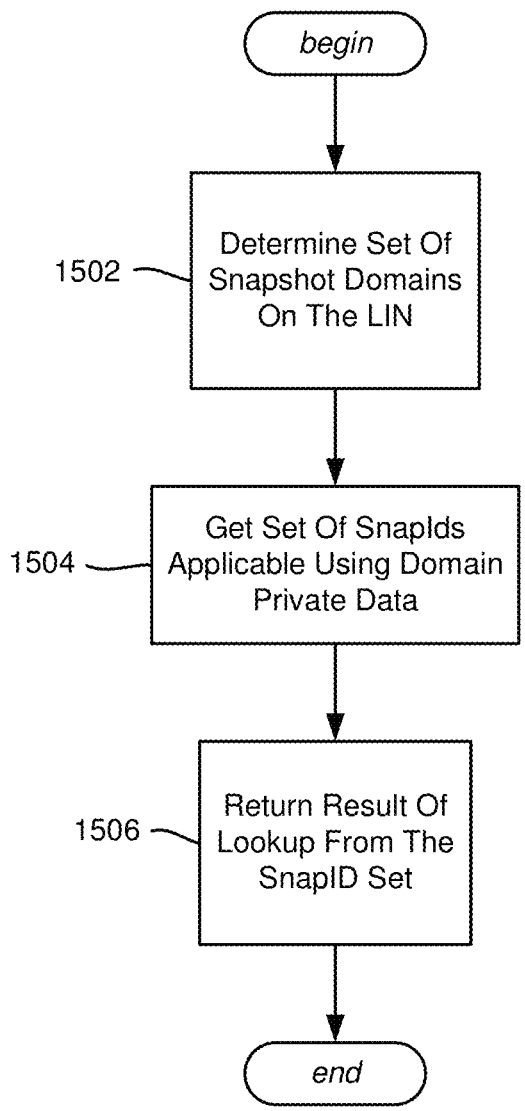
FIG. 15 is a flow/block diagram representing example operations related to checking the presence of a LIN in a given snapshot identifier with domain-based snapshots, in accordance with various aspects and implementations of the subject disclosure.

A system call is provided to check a snapshot, which corresponds to a prior system call used to check the presence of a LIN in a given SnapID. However, as represented in FIG. 15, instead of looking up the Snap ID attribute, the calls retrieves information from domains. More particularly, operation 1502 determines the set of snapshot domains on the LIN. Operation 1504 gets the set of SnapIDs applicable using domain private data. Operation 1506 returns the result of the lookup from the Snap ID set.

Turning to associating a file with snapshot-related information and obtaining the information, which in one implementation uses inode attributes, the SNAPID_RANGE inode attribute stores the range of snapshots applicable to the Inode(min and max Snap ID). The SNAPID_RANGE Mode attribute is used to validate a Snap ID. Here is a function to get the minimum and maximum SnapId, which work with domain-based snapshots. A live_snapids_getter function is used to retrieve non-deleted Snap IDs that govern a LIN. With domains, SnapIDs are retrieved from the SNAPIDS attribute and the domain instance data where applicable. The last paint attribute in the Mode continues to be used in domains-based snapshots.

As part of a snapshot, the coalescer (the write-back cache) is paused, and any uncommitted writes are flushed. A copy-in-write which relies on the last paint ID of the inode. The last paint continues to be updated for the inode with domain snapshots. Creating a snapshot flushes attributes and tags data in the coalescer. Note that it is feasible for the coalescer to be aware of domains and thus limit flushing to an impacted domain.

At least for a time, domain-based snapshots need to coexist with traditional snapshots. A transition SnapID (a field maintained in the LIN Master block) in conjunction with last_paint_snapid is used to implement correct behavior. A two-Mode copy-on-write approach is used to allow reuse of existing infrastructure.

When the system with existing traditional snapshots is upgraded and new domain-based snapshots are created, there can be files governed by both traditional snapshots and the newer domain-based snapshots. Writes to a file will need to determine if COW is necessary and the correct governance for COW. To do so the last_paint_id of the file is inspected. If it is less than the transition_snapid, this state implies that the file may be governed by both traditional and domains-based snapshots. In this case, the system will first paint (traditional snapshot painting algorithm) to determine the governance. This updates the SNAPIDS attribute and collects the traditional Snap IDs governing the file (the Snap IDs that are less than the transition_snapid). To determine the domain-based snapshots governing the file, the system uses the domains API to get the set of snapshot domains applicable to the file and the set of Snap IDs for the domains. The file is then COW-ed twice, once with the SNAPIDS attribute and then with the domains attribute. The last_paint_id is updated to the global Snap ID, and the SNAPID_RANGE is updated using the min-max from the governing Snap IDs. The COW-ed inodes are added to their corresponding snapshot tracking files. Once the last_paint_id is greater than the transition Snap ID, the system no longer has to paint and update the Snap IDs from the SNAPIDS attribute.

A second case is when the write is to a file with last_snap_id greater than transition Snap ID. In this case the file is only governed by domain snapshots. Thus, the updated governance is calculated from the Snap IDs retrieved from Domains. Thus, when last_paint_id of file<transition_snapid
 1. Use snapshot painting to determine Snap ID set of Mode.
 2. Determine SnapIDs from the domains active on the Mode.
 3. COW Mode with SNAPIDS attribute, with the calculated SNAPID_RANGE attribute.
 4. COW Mode with domains attribute, calculated SNAPID_RANGE.
 5. Update the last paint ID of the inode.
Conversely, when last_paint_id of file>=transition_snapid
 1. Determine governance from domains attribute. COW Mode with domain ID attribute.
 2. Add the SNAPID_RANGE attribute.
with respect to snap delete behavior, the delete LIN phase of the snapshot delete job deletes individual LINs for the snapshot. This is updated to ensure governance and COW is updated appropriately. The deleted Snap ID and transition Snap ID are needed to correctly handle deletion. When the deleted LIN has Snap ID less than or equal to the transition ID, it implies the file was governed by a traditional snapshot and thus has to remove the deleted Snap ID from the SNAPIDS attribute. Conversely, when the Snap ID is greater than or equal to transition Snap ID, it implies the file is governed by the domains snapshots. The moving of Mode to the correct snapshot tracking file when an inode is deleted remains the same.
 snap_id<transition_snapid
 1. Delete the Snap ID from the SNAPIDS attribute.
 2. Update the SNAPIDS attribute.
 When snap_id>=transition_snapid
 1. Delete the Snap ID from the domain private data.
From the user perspective, the get command retrieves the updated governance from the domain attribute. The SNAPIDS attribute and the domain attribute are used in the case the LIN is governed by both traditional and Domains snapshots. A validation command can validate SnapIDs from the snapshot domain private data. This needs caching of the snapshot patron instance data. The validation command will also handle snapshots using both the SNAPIDS attribute and domain attribute. An integrity scan can be used to validate that the SNAPIDS attribute does not contain Snap IDs greater than the transition_snapid.

As set forth above, another aspect is snapshot exclusion, in which a snapshot exclusion patron can created with the properties of instant=true, nesting=false, exclusions=false, deny_path_rename=false and no_hardlinks=false. The snapshot patron can create exclusion domains for the user-specified path and store the snap ID associated with the exclusion in the exclusion patron domain private data. The calculation of governance of an inode can exclude the exclusion SnapIDs, preventing COW-ing of files under the excluded directory.

Figure 16:
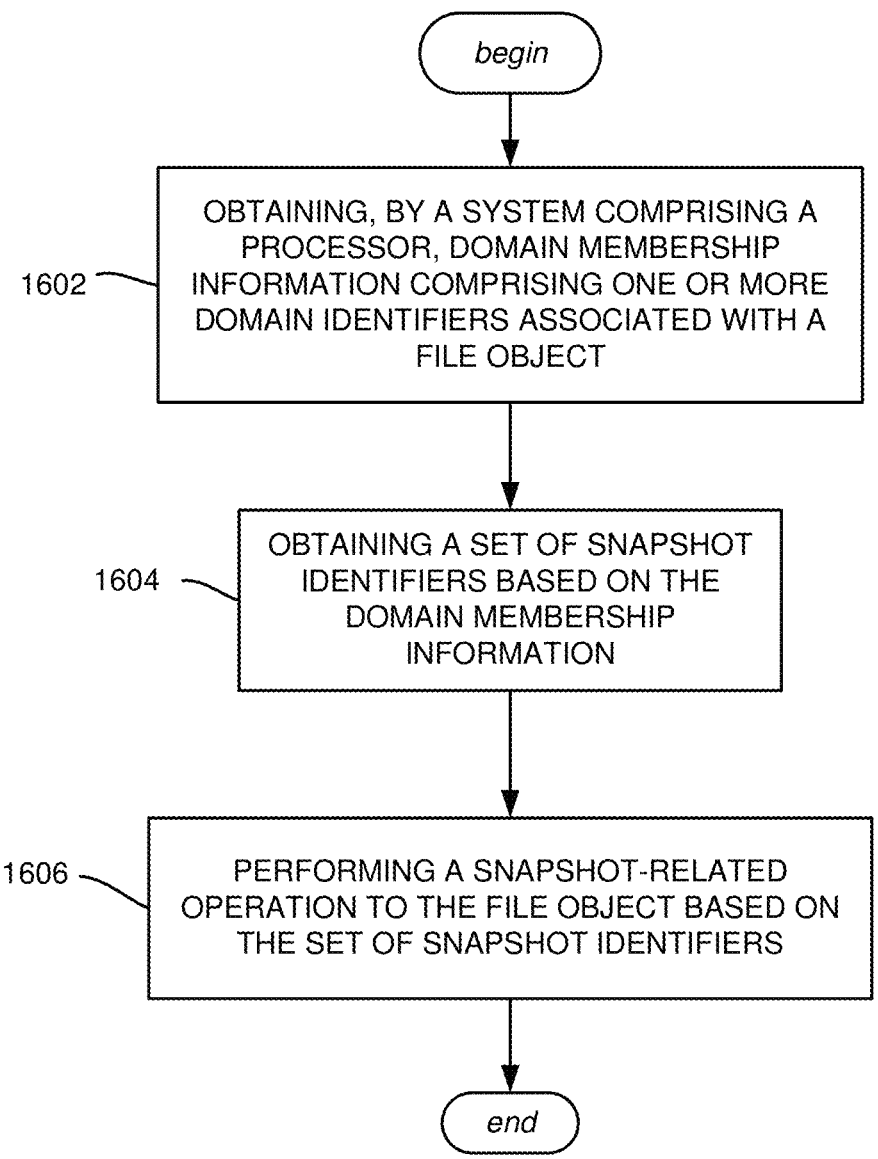
FIG. 16 is a flow diagram representing example operations related to using domain membership information with respect to a snapshot-related operation, in accordance with various aspects and implementations of the subject disclosure.

One or more aspects, such as implemented in example operations of a method as in FIG. 16, are directed towards obtaining (operation 1602), by a system comprising a processor, domain membership information comprising one or more domain identifiers associated with a file object. Operation 1604 represents obtaining a set of snapshot identifiers based on the domain membership information. Operation 1606 represents performing a snapshot-related operation to the file object based on the set of snapshot identifiers.

Performing the snapshot-related operation to the file object based on the set of snapshot identifiers can comprise performing a copy-on-write operation to the file object. Aspects can comprise determining a snapshot identifier range for the copy-on-write operation based on the set of snapshot identifiers.

Determining the snapshot identifier range based on the set of snapshot identifiers can comprise selecting a largest snapshot identifier from the set of snapshot identifiers as an end value of the snapshot identifier range and selecting a next largest snapshot identifier from the set of snapshot identifiers as a beginning value of the snapshot identifier range. Obtaining the domain membership information can comprise accessing file metadata associated with the file object.

Obtaining the set of snapshot identifiers can comprise using one or more domain identifiers corresponding to the domain membership information to retrieve snapshot-specific data associated with the one or more domain identifiers. Using the one or more domain identifiers corresponding to the domain membership information to retrieve the snapshot-specific data associated with the one or more domain identifiers. Using the one or more domain identifiers corresponding to the domain membership information to retrieve the snapshot-specific data associated with the one or more domain identifiers comprises requesting the snapshot-specific data from a domain manager. Aspects can comprise creating a snapshot, comprising creating a domain on a path corresponding to the snapshot, obtaining a domain identifier corresponding to the snapshot in response to the creating the domain, and adding a snapshot identifier associated with the snapshot to the snapshot-specific data associated with the domain identifier.

Figure 17:
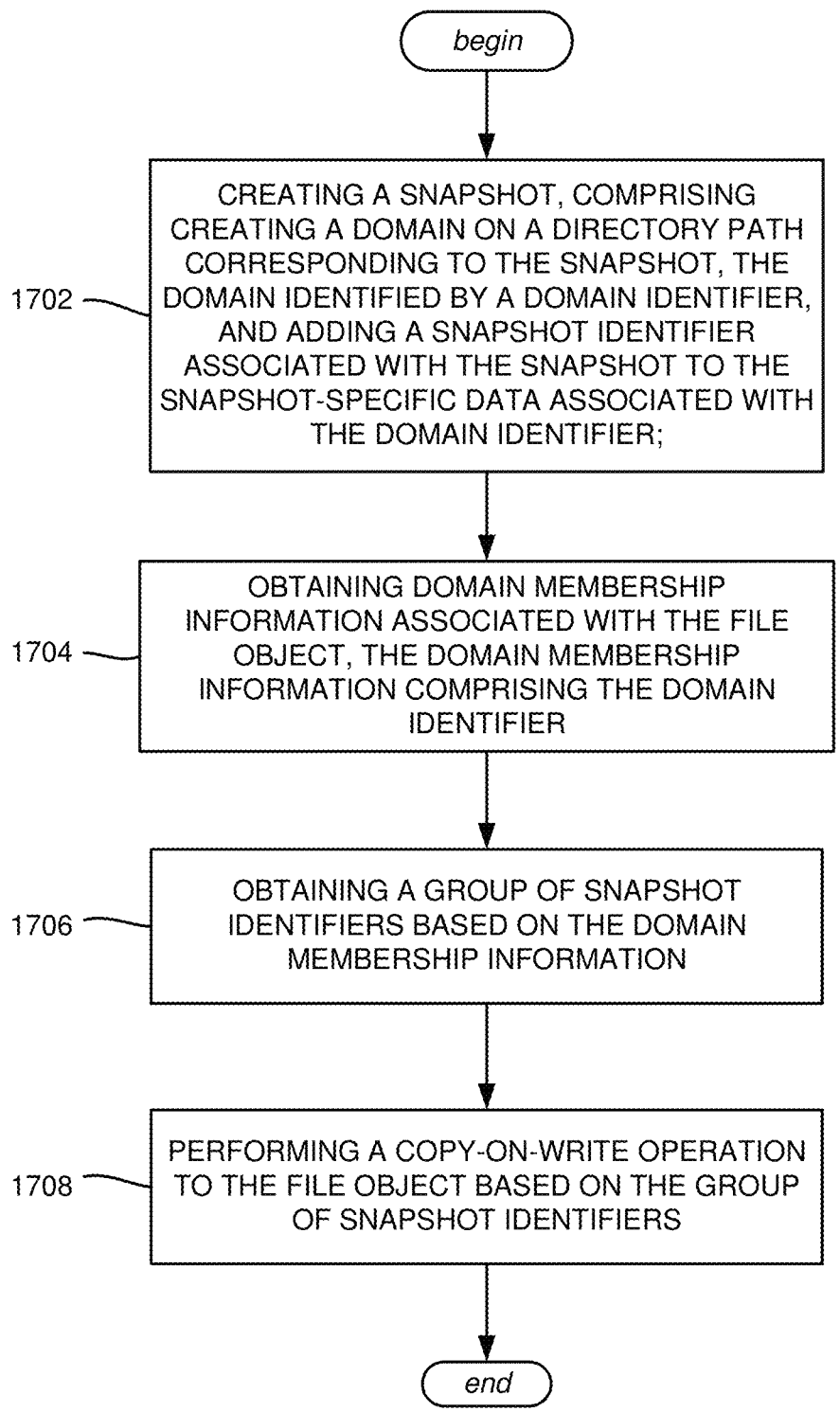
FIG. 17 is a flow diagram representing example operations related to creating a snapshot domain and using the domain for copy-on-write operations with respect to a file of that domain, in accordance with various aspects and implementations of the subject disclosure.

One or more example aspects are represented in FIG. 17, and can correspond to a system comprising a processor and a memory that stores executable instructions that, when executed by the processor, facilitate performance of operations and/or components. Example operations comprise operation 1502, which represents creating a snapshot, comprising creating a domain on a directory path corresponding to the snapshot, the domain identified by a domain identifier, and adding a snapshot identifier associated with the snapshot to the snapshot-specific data associated with the domain identifier. Operation 1704 represents obtaining domain membership information associated with the file object, the domain membership information comprising the domain identifier. Operation 1706 represents obtaining a group of snapshot identifiers based on the domain membership information. Operation 1708 represents performing a copy-on-write operation to the file object based on the group of snapshot identifiers.

Further operations can comprise determining that the copy-on-write operation is to be performed to the file object, which can comprise determining that a last snapshot identifier value associated with the file object is below a global snapshot identifier value.

Further operations can comprise determining a snapshot identifier range for the copy-on-write operation based on the group of snapshot identifiers.

Determining the snapshot identifier range based on the group of snapshot identifiers can comprise selecting a largest snapshot identifier from the group of snapshot identifiers as an end value of the snapshot identifier range and selecting a next largest snapshot identifier from the group of snapshot identifiers as a beginning value of the snapshot identifier range.

Obtaining the domain membership information can comprise accessing a file attribute associated with the file object. Obtaining the group of snapshot identifiers can comprise using the domain identifier to retrieve snapshot-specific data associated with the domain identifier. Using the domain identifier to retrieve the snapshot-specific data associated with the domain identifier can comprise requesting the snapshot-specific data from a domain manager.

Figure 18:
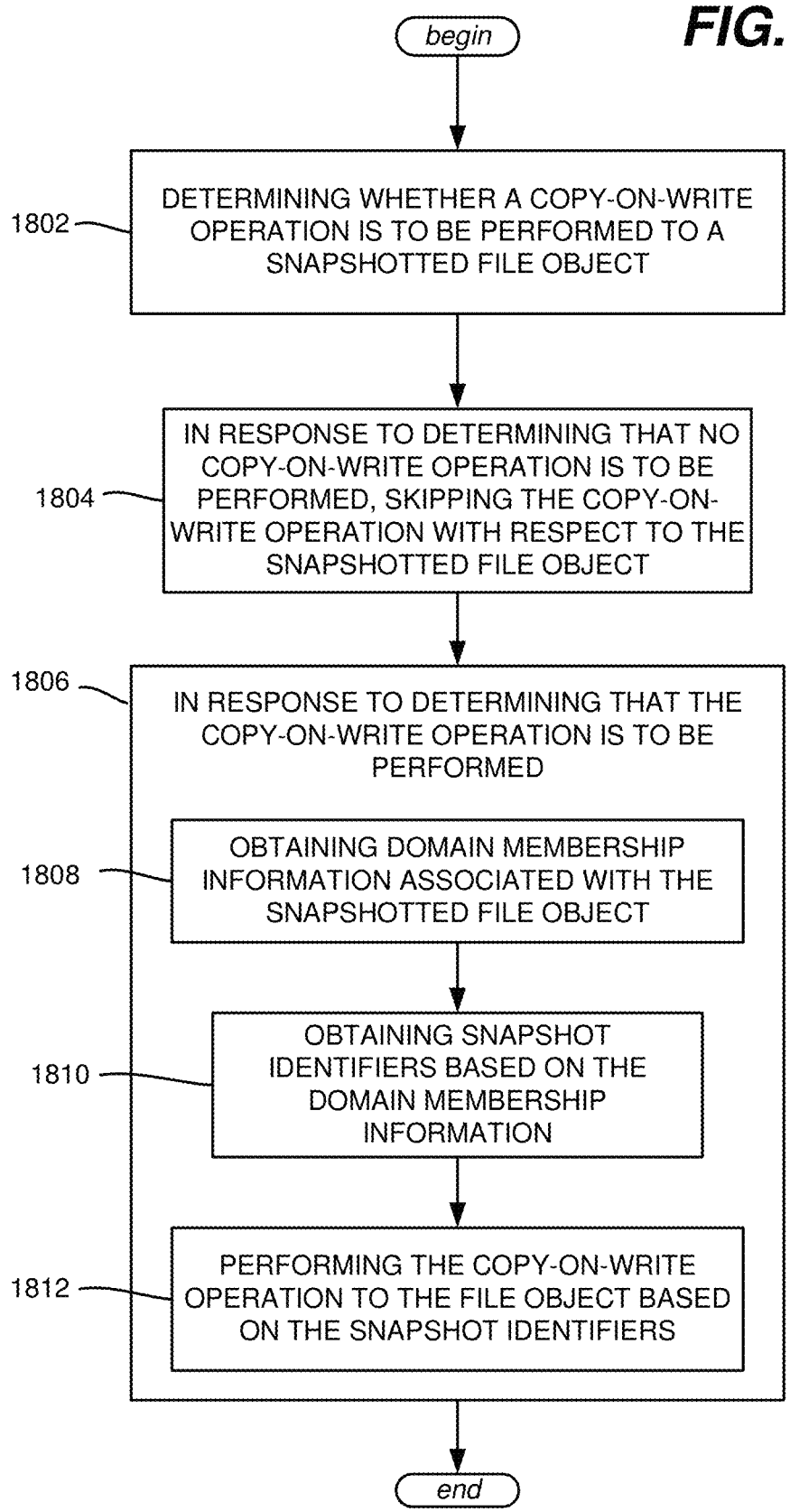
FIG. 18 is a flow diagram representing example operations related to determining whether a copy-on-write operation is to be performed with respect to a file of a domain, and actions related to the determining, in accordance with various aspects and implementations of the subject disclosure.

One or more aspects, such as implemented in a machine-readable storage medium, comprising executable instructions that, when executed by a processor, facilitate performance of operations, are represented in FIG. 18. Example operations comprise operation 1802, which represents determining whether a copy-on-write operation is to be performed to a snapshotted file object, and (operation 1804) in response to determining that no copy-on-write operation is to be performed, skipping the copy-on-write operation with respect to the snapshotted file object. As represented via operation 1806, in response to determining that the copy-on-write operation is to be performed, operation 1808 represents obtaining domain membership information associated with the snapshotted file object, operation 1810 represents obtaining snapshot identifiers based on the domain membership information; and operation 1812 represents performing the copy-on-write operation to the file object based on the snapshot identifiers.

Determining whether the copy-on-write operation is to be performed to the snapshotted file object can comprise evaluating a last snapshot identifier value associated with the file object relative a global snapshot identifier value, and determining that the copy-on-write operation is to be performed in response to the last snapshot identifier value associated with the file object being below the global snapshot identifier value, or determining that the copy-on-write operation is not to be performed in response to the last snapshot identifier value associated with the file object not being below the global snapshot identifier value.

Further operations can comprise, in response to determining that the copy-on-write operation is to be performed, determining a snapshot identifier range for the copy-on-write operation based on the snapshot identifiers. Determining the snapshot identifier range based on the snapshot identifiers can comprise selecting a largest snapshot identifier from the snapshot identifiers as an end value of the snapshot identifier range and selecting a next largest snapshot identifier from the snapshot identifiers as a beginning value of the snapshot identifier range.

In response to determining that the copy-on-write operation is to be performed, obtaining the snapshot identifiers can comprise using the domain membership information to retrieve snapshot-specific data associated with the domain membership information.

As can be seen, described herein is a snapshot technology based on the concept of domains. With domain-based snapshots, the expense of snapshot painting is avoided, (which significantly reduces deadlocks with other tree traversals). As another benefit, instead of having snapshot-related attributes (SNAPIDs) on billions of files (and possibly) millions of directories, thereby consuming gigabytes of data, domain-based snapshots centralize snapshot-related information into the SBT providing a significant space savings.

Figure 19:
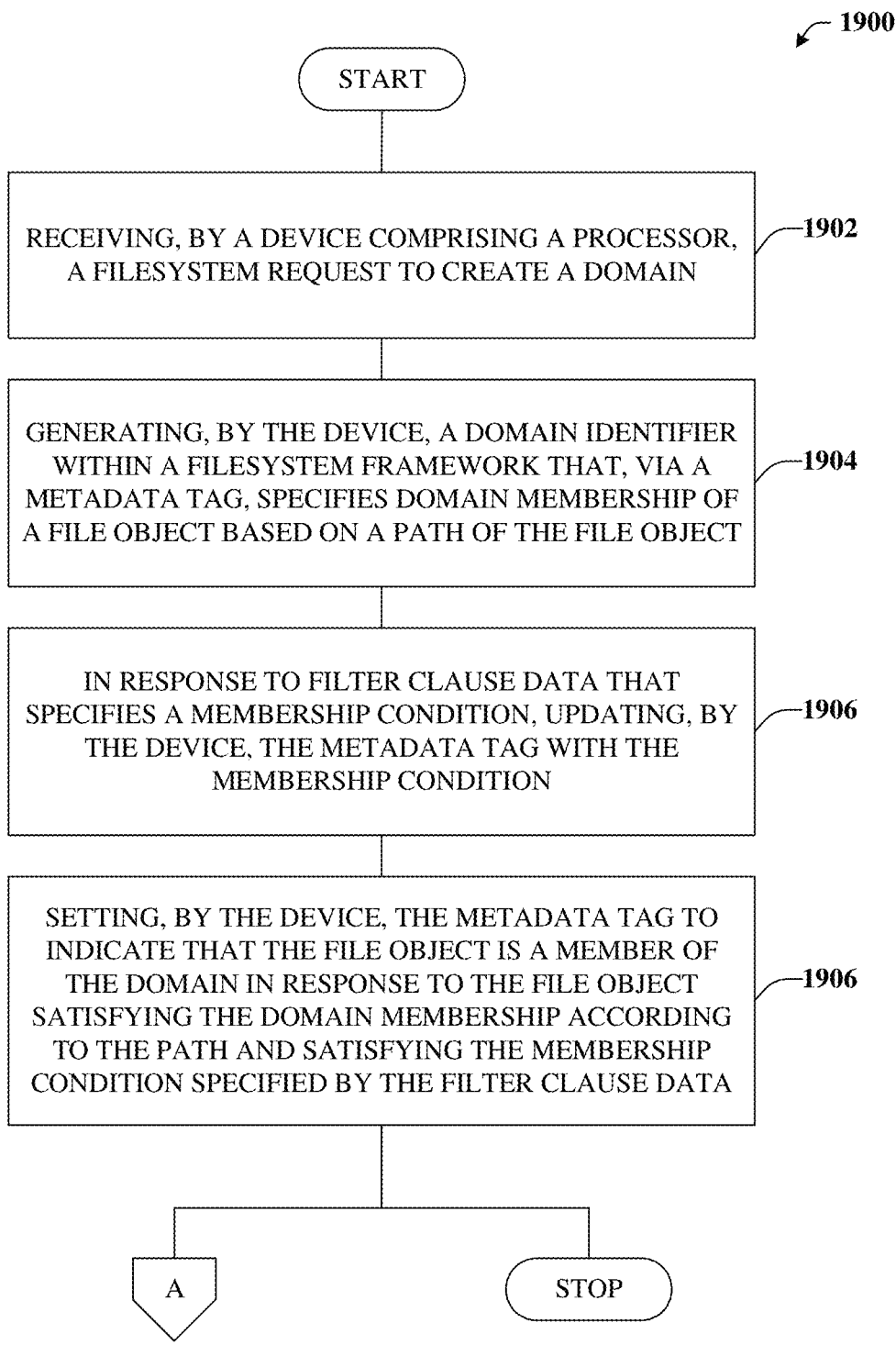
FIG. 19 is a flow diagram representing example operations related to implementing filter domains in which a membership condition is specified in accordance with various aspects and implementations of the subject disclosure.
Figure 20:
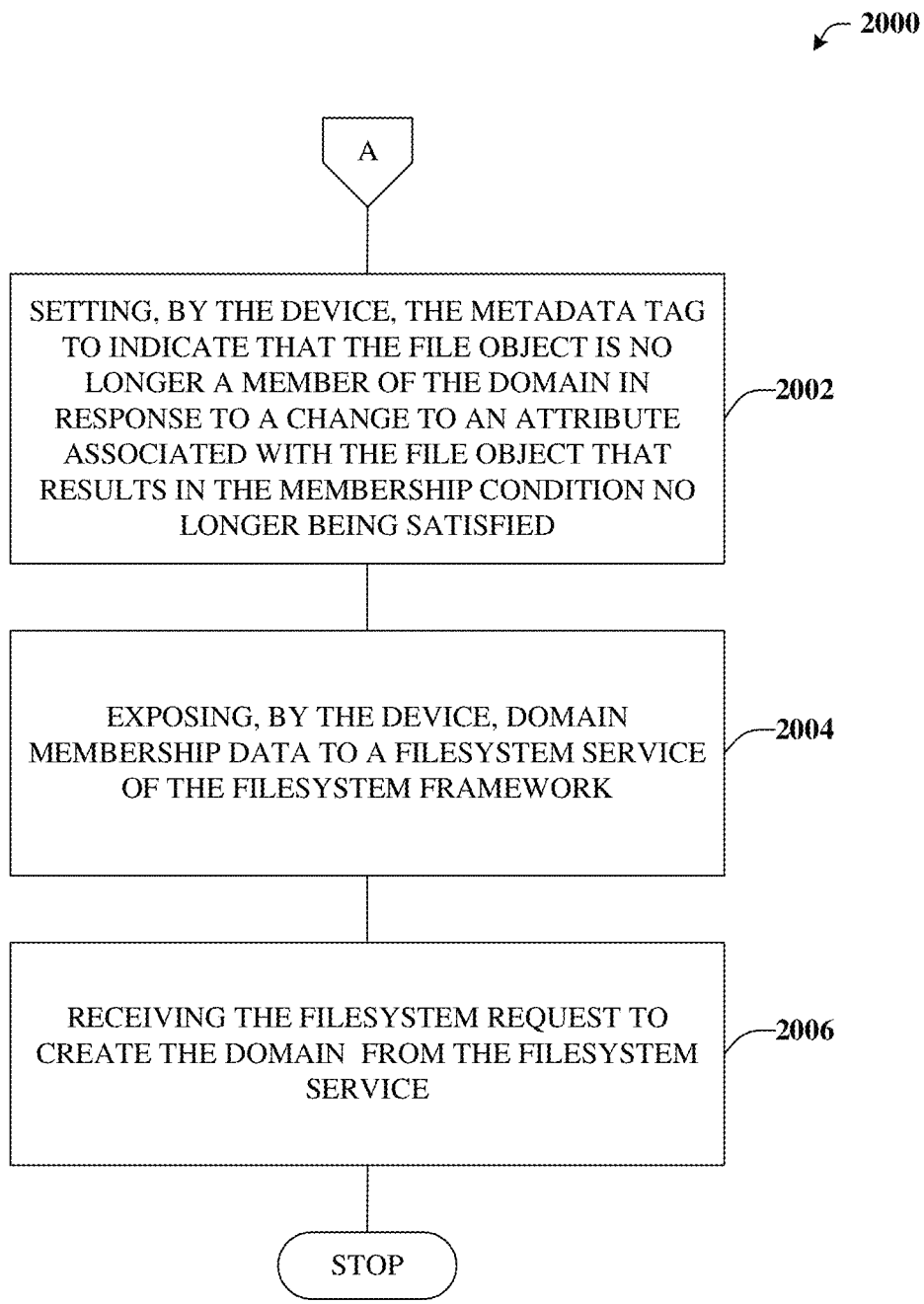
FIG. 20 is a flow diagram representing example operations related to additional aspects or elements of implementing filter domains in accordance with various aspects and implementations of the subject disclosure.

FIGS. 19 and 20 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 19, exemplary method 1900 is depicted. Method 1900 can utilize filter clause data comprising a membership condition to determine domain membership in accordance with certain embodiments of this disclosure. As has been detailed above, filter domains can allow filesystem services to identify a given file object as a member of a group based on an arbitrary set of parameters, which can be user-defined. In other words, filter domains generalizes the membership criteria of IFS domains in order to, e.g., allow files to be grouped by something beyond just path. Former mechanisms to support similar functionality relied on a manual and tedious layer built on top of the path-based IFS domains. To solve these issues, filter domains build the functionality into the filesystem itself in which the filtering can be accomplished as an automatic layering underneath the existing interfaces for IFS domains.

As one result, it can be much easier for users to conceptualize and interact with these domains. Additionally, applications that used to be coded for path-based filtering are now able to consume much richer filters. For example, at reference numeral 1902, a device comprising a processor can receive a filesystem request to create a domain. In response, at reference numeral 1904, the device can generate a domain identifier within a filesystem framework that, via a metadata tag, specifies domain membership of a file object based on a path of the file object. This metadata tag can exist in an inode and can be substantially similar to metadata 222 of FIG. 2.

If filter clause data exists, then filter domains can be invoked. For instance, at reference numeral 1906, in response to filter clause data that specifies a membership condition, the device can update the metadata tag with the membership condition. It is appreciated that filter clause data and/or the membership condition can in some embodiments be provided with the request to create the domain that is received in connection with reference numeral 1902. Various examples of the membership condition are provided in connection with FIG. 21. At reference numeral 1908, the device can set the metadata tag to indicate that the file object is a member of the domain in response to the file object satisfying the domain membership according to path and further satisfying the membership condition specified by the filter clause data. Method 1900 can stop or proceed to insert A, which is further detailed in connection with FIG. 20.

With reference now to FIG. 20, exemplary method 2000 is illustrated. Method 2000 can provide for additional elements or aspects in connection with utilizing filter clause data comprising a membership condition to determine domain membership in accordance with certain embodiments of this disclosure. For example, at reference numeral 2002, the device can set the metadata tag to indicate that the file object is no longer a member of the domain in response to a change to an attribute associated with the file object that results in the membership condition no longer being satisfied.

At reference numeral 2004, the device can expose domain membership data to a filesystem service of the filesystem framework. These filesystem services are referred to herein as domain patrons and can be, e.g., a snapshot service, a quota service, and so forth. Domain patrons can be empowered to create domains for their own needs and purposes. Hence, at reference numeral 2006, the request to create the domain can be received from the domain patron and/or the filesystem service mentioned.

Figure 21:
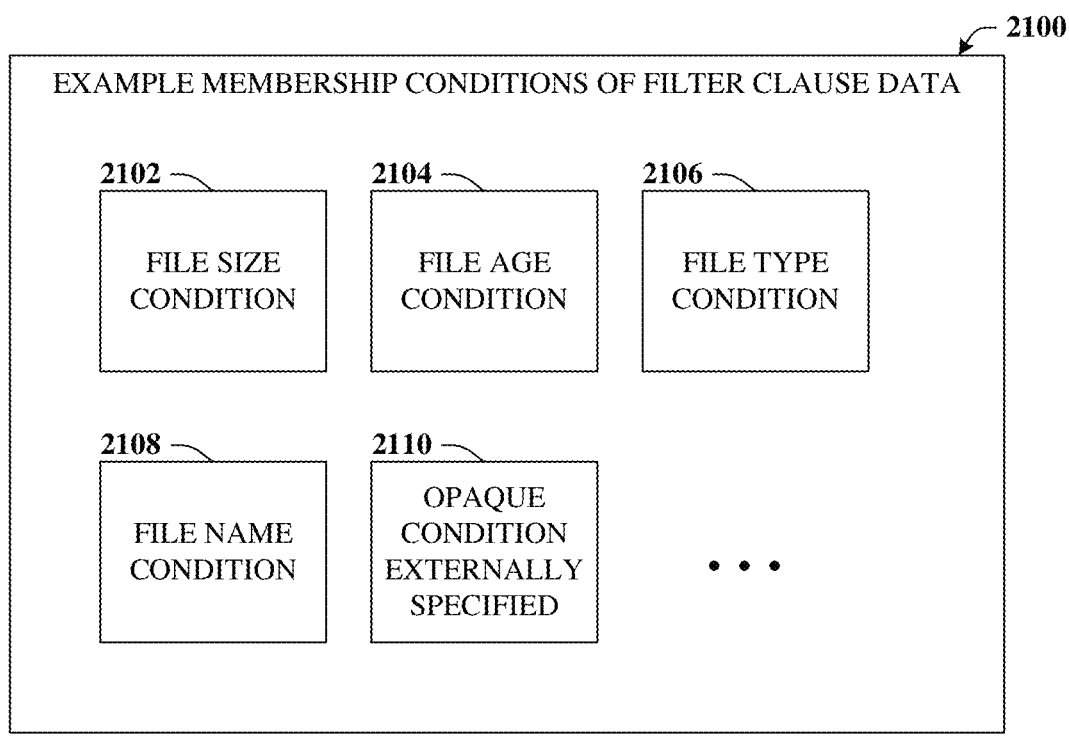
FIG. 21 is a block diagram representing non-limiting example membership conditions in accordance with various aspects and implementations of the subject disclosure.

Turning now to FIG. 21, block diagram 2100 is depicted. Block diagram 2100 illustrates various example membership conditions of filter clause data. For instance, membership condition can be based on a file size condition 2102, e.g., the file size is above or below a defined threshold. As another example, membership condition can be based on a file age condition, e.g., the file age is greater than or less than a defined file age. As yet another example, the membership condition can be based on a file type condition, e.g., files having a particularly file or encoding format, or a particular file extension. The file type can be determined by looking at the file name extension/suffix, by examining the file, or by any other suitable technique. As still another example, the membership condition can be based on a file name condition, e.g., files having or including a defined character or string of characters or the like. In some embodiments, the membership condition can be opaque condition 2110, which can be externally specified.

As noted herein, IFS domains can operate to record an attribute on the file which is used to look up a give file object's membership into a domain. This attribute can be automatically applied to all the files under the folder designated as a root of the domain. Filter domains allows users to use arbitrary criteria, including but not limited to the contents. For example, the metadata tag can allow the system to tag files with arbitrary criteria. This functionality can be exported as an external API so any application with user data management can tag the files. As noted, it is possible that the user might want to categorize files based on dynamic criteria such as age of the file, which changes with time and without any filesystem code necessarily executing.

IFS domains allows a per-domain configuration storage. Thus, along with the tags, the formula for the dynamic part (e.g., age>10 days) can be attached to a filter domain tag to allow IFS domains to filter in the files once the formula conditions are met. Such tags can be fully integrated with IFS domains infrastructure to allow callers to filter out only those file objects that are tagged. As a result, IFS domains can learn to recognize the filter domain tags (e.g., those comprising one or more membership conditions). Such can be readily accomplished under the IFS domains API.

Figure 22:
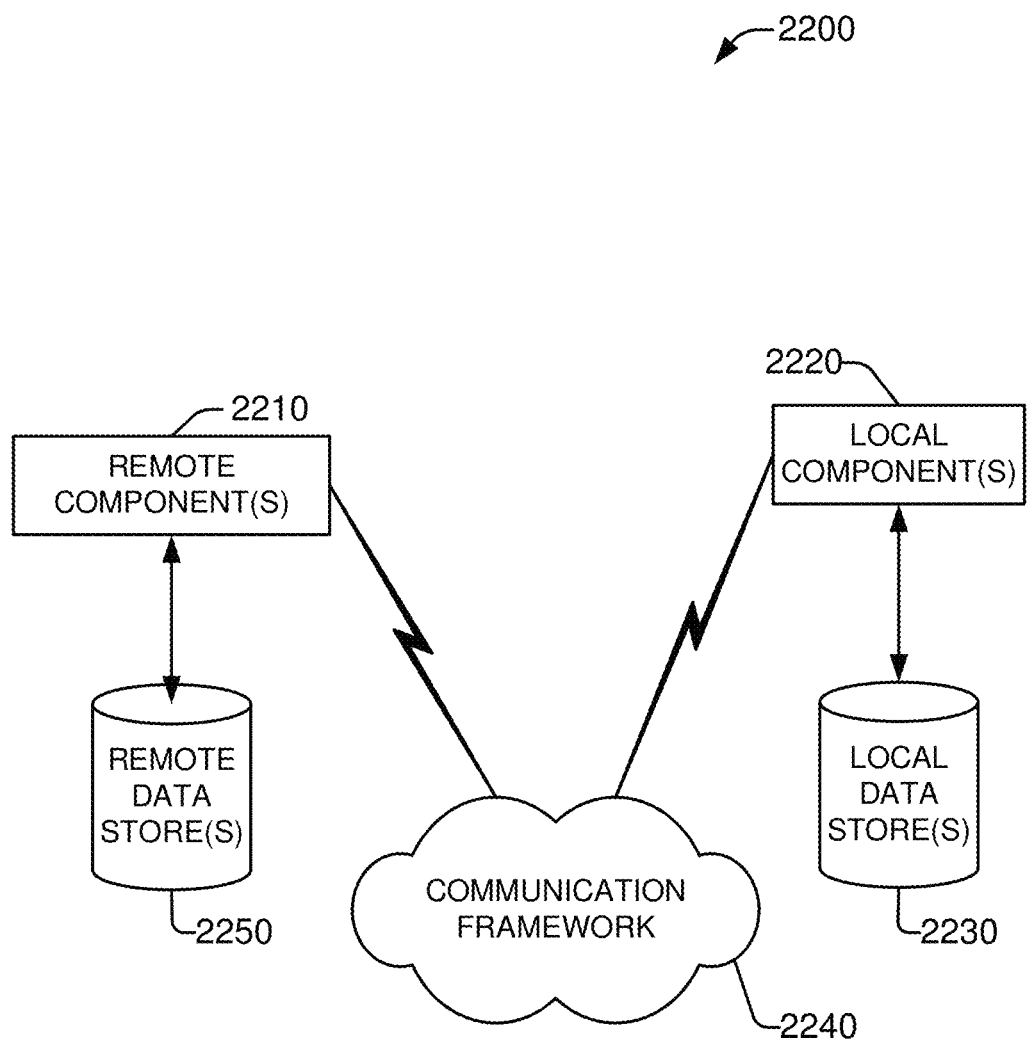
FIG. 22 depicts an example schematic block diagram of a computing environment with which the disclosed subject matter can interact, in accordance with various aspects and implementations of the subject disclosure.

FIG. 22 is a schematic block diagram of a computing environment 2200 with which the disclosed subject matter can interact. The system 2200 comprises one or more remote component(s) 2210. The remote component(s) 2210 can be hardware and/or software (e.g., threads, processes, computing devices). In some embodiments, remote component(s) 2210 can be a distributed computer system, connected to a local automatic scaling component and/or programs that use the resources of a distributed computer system, via communication framework 2240. Communication framework 2240 can comprise wired network devices, wireless network devices, mobile devices, wearable devices, radio access network devices, gateway devices, femtocell devices, servers, etc.

The system 2200 also comprises one or more local component(s) 2220. The local component(s) 2220 can be hardware and/or software (e.g., threads, processes, computing devices). In some embodiments, local component(s) 2220 can comprise an automatic scaling component and/or programs that communicate/use the remote resources 2210 and 2220, etc., connected to a remotely located distributed computing system via communication framework 2240.

One possible communication between a remote component(s) 2210 and a local component(s) 2220 can be in the form of a data packet adapted to be transmitted between two or more computer processes. Another possible communication between a remote component(s) 2210 and a local component(s) 2220 can be in the form of circuit-switched data adapted to be transmitted between two or more computer processes in radio time slots. The system 2200 comprises a communication framework 2240 that can be employed to facilitate communications between the remote component(s) 2210 and the local component(s) 2220, and can comprise an air interface, e.g., Uu interface of a UMTS network, via a long-term evolution (LTE) network, etc. Remote component(s) 2210 can be operably connected to one or more remote data store(s) 2250, such as a hard drive, solid state drive, SIM card, device memory, etc., that can be employed to store information on the remote component(s) 2210 side of communication framework 2240. Similarly, local component(s) 2220 can be operably connected to one or more local data store(s) 2230, that can be employed to store information on the local component(s) 2220 side of communication framework 2240.

Figure 23:
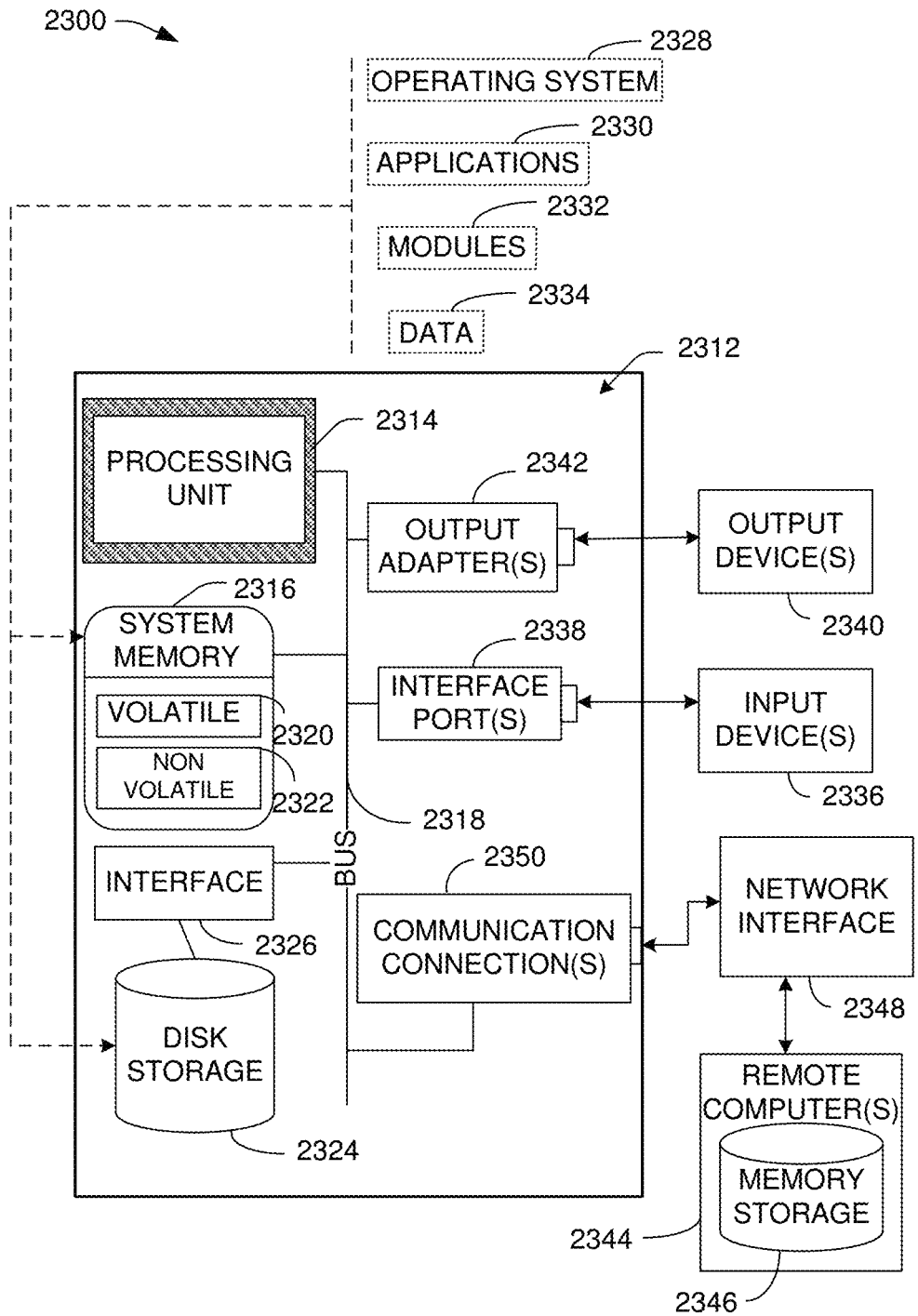
FIG. 23 illustrates an example block diagram of a computing system operable to execute the disclosed systems and methods in accordance with various aspects and implementations of the subject disclosure.

In order to provide a context for the various aspects of the disclosed subject matter, FIG. 23, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 2320 (see below), nonvolatile memory 2322 (see below), disk storage 2324 (see below), and memory storage 2346 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 23 illustrates a block diagram of a computing system 2300 operable to execute the disclosed systems and methods in accordance with one or more embodiments/implementations described herein. Computer 2312, can comprise a processing unit 2314, a system memory 2316, and a system bus 2318. System bus 2318 couples system components comprising, but not limited to, system memory 2316 to processing unit 2314. Processing unit 2314 can be any of various available processors. Dual microprocessors and other multiprocessor architectures also can be employed as processing unit 2314.

System bus 2318 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 2316 can comprise volatile memory 2320 and nonvolatile memory 2322. A basic input/output system, containing routines to transfer information between elements within computer 2312, such as during start-up, can be stored in nonvolatile memory 2322. By way of illustration, and not limitation, nonvolatile memory 2322 can comprise read only memory, programmable read only memory, electrically programmable read only memory, electrically erasable read only memory, or flash memory. Volatile memory 2320 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 2312 can also comprise removable/non-removable, volatile/non-volatile computer storage media. FIG. 23 illustrates, for example, disk storage 2324. Disk storage 2324 comprises, but is not limited to, devices like a magnetic disk drive, floppy disk drive, tape drive, flash memory card, or memory stick. In addition, disk storage 2324 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 2324 to system bus 2318, a removable or non-removable interface is typically used, such as interface 2326.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 23 describes software that acts as an intermediary between users and computer resources described in suitable operating environment 2300. Such software comprises an operating system 2328. Operating system 2328, which can be stored on disk storage 2324, acts to control and allocate resources of computer system 2312. System applications 2330 take advantage of the management of resources by operating system 2328 through program modules 2332 and program data 2334 stored either in system memory 2316 or on disk storage 2324. It is to be noted that the disclosed subject matter can be implemented with various operating systems or combinations of operating systems.

A user can enter commands or information into computer 2312 through input device(s) 2336. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 2312. Input devices 2336 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 2314 through system bus 2318 by way of interface port(s) 2338. Interface port(s) 2338 comprise, for example, a serial port, a parallel port, a game port, a universal serial bus, an infrared port, a Bluetooth port, an IP port, or a logical port associated with a wireless service, etc. Output device(s) 2340 use some of the same type of ports as input device(s) 2336.

Thus, for example, a universal serial busport can be used to provide input to computer 2312 and to output information from computer 2312 to an output device 2340. Output adapter 2342 is provided to illustrate that there are some output devices 2340 like monitors, speakers, and printers, among other output devices 2340, which use special adapters. Output adapters 2342 comprise, by way of illustration and not limitation, video and sound cards that provide means of connection between output device 2340 and system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. Remote computer(s) 2344 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 2312. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 2346 is illustrated with remote computer(s) 2344. Remote computer(s) 2344 is logically connected to computer 2312 through a network interface 2348 and then physically connected by way of communication connection 2350. Network interface 2348 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 2350 refer(s) to hardware/software employed to connect network interface 2348 to bus 2318. While communication connection 2350 is shown for illustrative clarity inside computer 2312, it can also be external to computer 2312. The hardware/software for connection to network interface 2348 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a processor; and
   a memory that stores executable instructions that, when executed by the processor, facilitate performance of operations, comprising:
   in response to a filesystem request to create a domain, wherein the domain represents a defined portion of a filesystem namespace, creating a domain identifier within the filesystem that, via a metadata tag, indicates whether a file object is a member of the domain based on a first membership condition that is a function of a path of a file object;
   in response to a first determination that filter clause data exists, wherein the filter clause data specifies a second membership condition, different than the first membership condition, representing a prerequisite to be satisfied before applying the metadata tag to the file object, updating the metadata tag with the second membership condition, and wherein the second membership condition comprises a file age condition that is satisfied based on a first comparison of a file age of the file object to a defined threshold age indicated by the file age condition and at least one of a file size condition that is satisfied based on a second comparison of a file size of the file object to a defined threshold size indicated by the file size condition or a file name condition that is satisfied based on a third comparison of a file name of the file object to a defined name string indicated by the file name condition, resulting in the prerequisite being satisfied as a function of the first comparison and the metadata tag being updated with the defined threshold age and a second portion of the second membership condition being satisfied as a function of: the second comparison and the metadata tag being updated with the defined threshold size, or the third comparison and the metadata tag being updated with the defined name string; and
   in response to a second determination that the file object satisfies both the first membership condition, which is a function of the path of the file object, and the second membership condition specified by the filter clause data, applying the metadata tag to the file object to indicate that the file object is a member of the domain.

2. The system of claim 1, wherein the operations further comprise setting the metadata tag to indicate that the file object is no longer a member of the domain in response to a change to an attribute associated with the file object that results in the second membership condition no longer being satisfied.

3. The system of claim 1, wherein the operations further comprise exposing domain membership data to a filesystem service of the filesystem.

4. The system of claim 3, wherein the filesystem service is at least one of a group comprising a snapshot filesystem service and a quota filesystem service.

5. The system of claim 1, wherein the second membership condition comprises the file size condition that is satisfied based on the second comparison.

6. The system of claim 1, wherein the second membership condition comprises the file name condition that is satisfied based on the third comparison.

7. The system of claim 1, wherein the second portion of the second membership condition further comprises a file type condition that is satisfied based on the file object being of a defined file type and resulting in the metadata tag being updated with the defined file type.

8. The system of claim 1, wherein the operations further comprise receiving the filter clause data comprising an opaque membership condition that is specified externally.

9. The system of claim 1, wherein the second membership condition is specified externally and received as the filter clause data.

10. A non-transitory computer-readable medium comprising instructions that, in response to execution, cause a system comprising a processor to perform operations, comprising:

receiving a filesystem request to create a domain, wherein the domain is indicative of a filesystem namespace partition;

generating a domain identifier, representative of the domain, within a filesystem, the domain identifier comprising a metadata tag that indicates whether a file object is a member of the domain based on a first membership condition that depends on a path of the file object;

in response to a first determination that filter clause data exists, wherein the filter clause data specifies a second membership condition, different than the first membership condition, that is to be satisfied before applying the metadata tag to the file object, updating the metadata tag with the second membership condition that is to be satisfied for domain membership, and wherein the second membership condition comprises a file age condition that is satisfied based on a first comparison of a file age of the file object to a defined threshold age indicated by the file age condition and at least one of a file size condition that is satisfied based on a second comparison of a file size of the file object to a defined threshold size indicated by the file size condition or a file name condition that is satisfied based on a third comparison of a file name of the file object to a defined name string indicated by the file name condition, resulting in a first portion of the second membership condition being satisfied as a function of the first comparison and the metadata tag being updated with the defined threshold age and a second portion of the second membership condition being satisfied as a function of: the second comparison and the metadata tag being updated with the defined threshold size, or the third comparison and the metadata tag being updated with the defined name string; and in response to a second determination that the file object satisfies both the first membership condition that depends on the path of the file object and the second membership condition that depends on the filter clause data, applying the metadata tag to the file object to indicate that the file object is a member of the domain in response to the file object satisfying the first membership condition and satisfying the second membership condition.

11. The non-transitory computer-readable medium of claim 10, wherein the second membership condition comprises the file size condition that is satisfied based on the second comparison.

12. The non-transitory computer-readable medium of claim 10, wherein the second membership condition comprises the file name condition that is satisfied based on the third comparison.

13. The non-transitory computer-readable medium of claim 10, wherein the second portion of the second membership condition further comprises a file type condition that is satisfied based on the file object being of a defined file type and resulting in the metadata tag being updated with the defined file type.

14. The non-transitory computer-readable medium of claim 10, wherein the operations further comprise receiving the filter clause data comprising an opaque membership condition that is specified externally.

15. The non-transitory computer-readable medium of claim 10, wherein the operations further comprise receiving the filter clause data comprising the second membership condition that is specified externally.

16. A method, comprising:

receiving, by a device comprising a processor, a filesystem request to create a domain, wherein the domain represents a portion of a filesystem namespace;

generating, by the device, a domain identifier within a filesystem framework that, via a metadata tag, specifies whether a file object is a member of the domain based on a first membership condition that is a function of a path of a file object;

in response to filter clause data that specifies a second membership condition that differs from the first membership condition, updating, by the device, the metadata tag with the second membership condition, wherein the second membership condition represents a condition, other than the path of the file object, to be satisfied before applying the domain identifier to the file object, and wherein the second membership condition comprises a file age condition that is satisfied based on a first comparison of a file age of the file object to a defined threshold age indicated by the file age condition and at least one of a file size condition that is satisfied based on a second comparison of a file size of the file object to a defined threshold size indicated by the file size condition or a file name condition that is satisfied based on a third comparison of a file name of the file object to a defined name string indicated by the file name condition, resulting in a first portion of the second membership condition being satisfied as a function of the first comparison and the metadata tag being updated with the defined threshold age and a second portion of the second membership condition being satisfied as a function of: the second comparison and the metadata tag being updated with the defined threshold size, or the third comparison and the metadata tag being updated with the defined name string; and setting, by the device, the metadata tag to indicate that the file object is a member of the domain in response to the file object satisfying the first membership condition according to the path of the file object and satisfying the second membership condition specified by the filter clause data.

17. The method of claim 16, further comprising setting, by the device, the metadata tag to indicate that the file object is no longer a member of the domain in response to a change to an attribute associated with the file object that results in the second membership condition no longer being satisfied.

18. The method of claim 16, further comprising exposing, by the device, domain membership data to a filesystem service of the filesystem framework.

19. The method of claim 18, wherein the filesystem request to create the domain is received from the filesystem service.

20. The method of claim 16, wherein the second portion of the second membership condition further comprises a file type condition that is satisfied based on the file object being of a defined file type and resulting in the metadata tag being updated, by the device, with the defined file type.

* * * * *